US011156448B2

United States Patent
Yamauchi et al.

(10) Patent No.: US 11,156,448 B2
(45) Date of Patent: Oct. 26, 2021

(54) INTERFERENCE OBSERVATION DEVICE AND INTERFERENCE OBSERVATION METHOD

(71) Applicant: HAMAMATSU PHOTONICS K.K., Hamamatsu (JP)

(72) Inventors: Toyohiko Yamauchi, Hamamatsu (JP); Hidenao Yamada, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 560 days.

(21) Appl. No.: 16/061,499

(22) PCT Filed: Dec. 7, 2016

(86) PCT No.: PCT/JP2016/086391
§ 371 (c)(1),
(2) Date: Jun. 12, 2018

(87) PCT Pub. No.: WO2017/104507
PCT Pub. Date: Jun. 22, 2017

(65) Prior Publication Data
US 2020/0263972 A1 Aug. 20, 2020

(30) Foreign Application Priority Data
Dec. 14, 2015 (JP) .............................. JP2015-243271

(51) Int. Cl.
*G01B 9/02* (2006.01)
*G01N 21/45* (2006.01)
(Continued)

(52) U.S. Cl.
CPC ......... *G01B 9/02041* (2013.01); *G01N 21/45* (2013.01); *G02B 21/14* (2013.01); *G02B 21/18* (2013.01)

(58) Field of Classification Search
CPC ............ G01B 9/02041; G01B 9/02004; G01N 21/45; G02B 21/14; G02B 21/18; G02B 21/00; G02F 1/21
See application file for complete search history.

(56) References Cited

U.S. PATENT DOCUMENTS 3,715,164 A * 2/1973 Heflinger ............. G01N 21/453
356/457
5,319,435 A * 6/1994 Melle ..................... G01B 11/16
250/227.18
(Continued)

FOREIGN PATENT DOCUMENTS

JP S61-158311 A 7/1986
JP H2-022502 A 1/1990
(Continued)

OTHER PUBLICATIONS

International Preliminary Report on Patentability dated Jun. 28, 2018 for PCT/JP2016/086391.
(Continued)

*Primary Examiner* — Mohamed K Amara
(74) *Attorney, Agent, or Firm* — Faegre Drinker Biddle & Reath LLP

(57) ABSTRACT

An interference observation apparatus includes a light source, a splitting beam splitter, a combining beam splitter, a mirror, a beam splitter, a mirror, a piezo element, a stage, a photodetector, an image acquisition unit, and a current control unit. An interference optical system from the splitting beam splitter to the combining beam splitter forms a Mach-Zehnder interferometer. The current control unit controls a wavelength of laser light output from the light source to adjust a phase difference between two split light components at the combining by the combining beam splitter.

14 Claims, 18 Drawing Sheets

(51) Int. Cl.
*G02B 21/14* (2006.01)
*G02B 21/18* (2006.01)

(56) References Cited

U.S. PATENT DOCUMENTS

| | | | | |
|---|---|---|---|---|
| 5,847,827 | A * | 12/1998 | Fercher | G01B 9/02063 356/493 |
| 6,040,914 | A * | 3/2000 | Bortz | G01J 3/433 250/345 |
| 7,362,449 | B2 * | 4/2008 | Dubois | G02B 21/22 356/515 |
| 7,414,779 | B2 * | 8/2008 | Huber | G01B 9/02069 359/333 |
| 7,564,565 | B2 * | 7/2009 | Shimizu | A61B 5/0066 356/479 |
| 8,115,934 | B2 * | 2/2012 | Boppart | G01B 9/02014 356/479 |
| 8,934,103 | B2 * | 1/2015 | Kim | G01N 21/45 356/450 |
| 9,060,689 | B2 * | 6/2015 | Tearney | G01N 21/45 |
| 9,433,353 | B2 * | 9/2016 | Hanebuchi | G01B 9/02091 |
| 9,857,160 | B1 * | 1/2018 | Hoffer, Jr. | G01B 9/02028 |
| 10,209,056 | B2 * | 2/2019 | Yamauchi | G02B 21/00 |
| 10,393,500 | B2 * | 8/2019 | Yamauchi | G01B 9/02015 |
| 2003/0124438 | A1 * | 7/2003 | Stepanov | G02B 5/1857 430/2 |
| 2005/0105097 | A1 * | 5/2005 | Fang-Yen | G01B 9/02071 356/497 |
| 2008/0180683 | A1 * | 7/2008 | Kemp | G01B 9/02072 356/491 |
| 2010/0226655 | A1 * | 9/2010 | Kim | G02B 27/145 398/139 |
| 2012/0170046 | A1 * | 7/2012 | Flanders | G01B 9/02069 356/479 |
| 2012/0200859 | A1 * | 8/2012 | Breitenstein | A61B 3/102 356/479 |
| 2015/0336097 | A1 * | 11/2015 | Wang | B01L 3/502761 435/30 |

FOREIGN PATENT DOCUMENTS

| | | |
|---|---|---|
| JP | H6-194120 A | 7/1994 |
| JP | H06-273112 A | 9/1994 |
| JP | H10-504395 | 4/1998 |
| JP | H10-232204 A | 9/1998 |
| JP | 2001-4538 A | 1/2001 |
| JP | 2002-71518 A | 3/2002 |
| JP | 2003-148921 A | 5/2003 |
| JP | 2005-326249 A | 11/2005 |
| JP | 2009-116082 | 5/2009 |
| JP | 2012-132838 A | 7/2012 |
| JP | 2014-508922 | 4/2014 |
| WO | WO 96/006324 A1 | 2/1996 |
| WO | WO 2012/103233 A1 | 8/2012 |
| WO | WO-2016/121248 A1 | 8/2016 |

OTHER PUBLICATIONS

Christopher J. Mann et al., "High-resolution quantitative phase-contrast microscopy by digital holography," Optics Express, Oct. 2005, pp. 8693-8698, vol. 13, No. 22.
A. A. Freschi et al., "Adjustable phase control in stabilized interferometry," Optics Letters, Mar. 1995, pp. 635-637, vol. 20, No. 6.
Toyohiko Yamauchi et al.,"Low-coherent quantitative phase microscope for nanometer-scale measurement of living cells morphology," Optics Express, Aug. 2008, pp. 12227-12238, vol. 16, No. 16.
Hidenao Iwai et al.,"Quantitative phase imaging using actively stabilized phase-shifting low-coherence interferometry," Optics Letters, Oct. 2004, pp. 2399-2401, vol. 29, No. 20.
Ichirou Yamaguchi et al., "Active phase-shifting interferometers for shape and deformation measurements," Optical Engineering, Oct. 1996, pp. 2930-2937, vol. 35, No. 10.

* cited by examiner

Fig.12
(a)
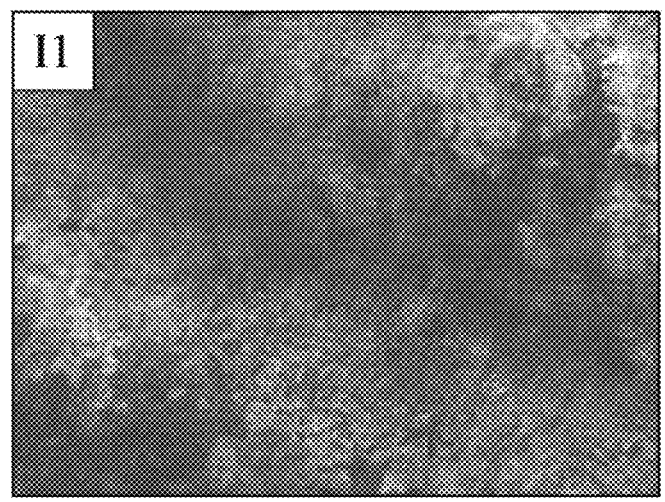
(b)
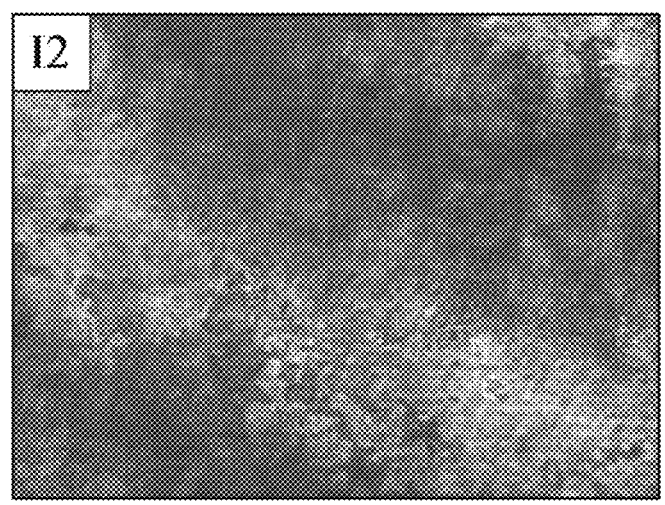

Fig.13
(a)
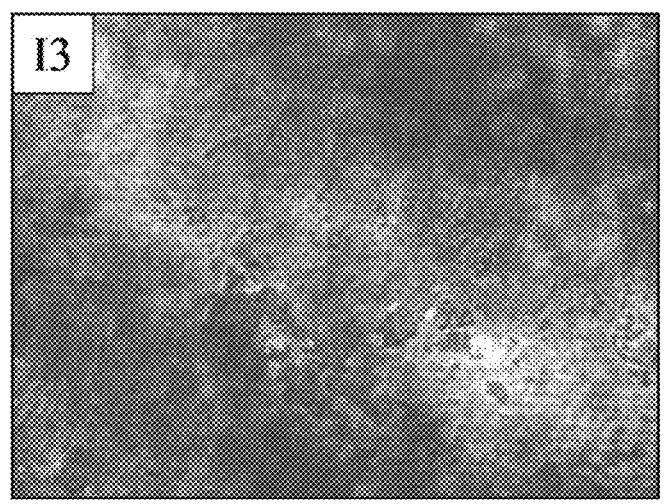
(b)
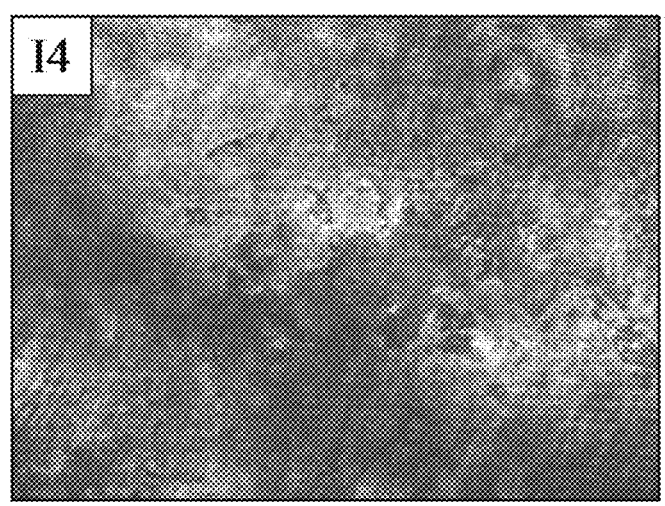

Fig.14
(a)
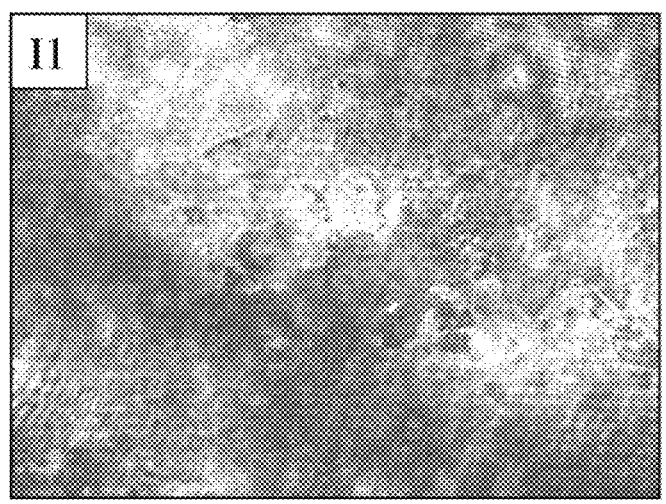
(b)
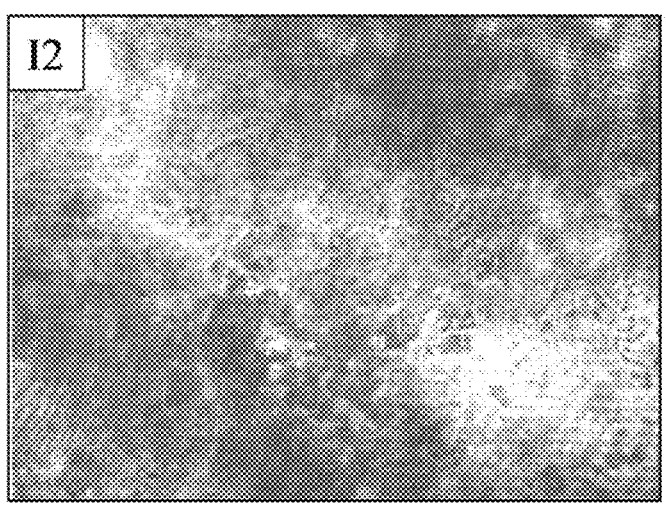

Fig.15
(a)
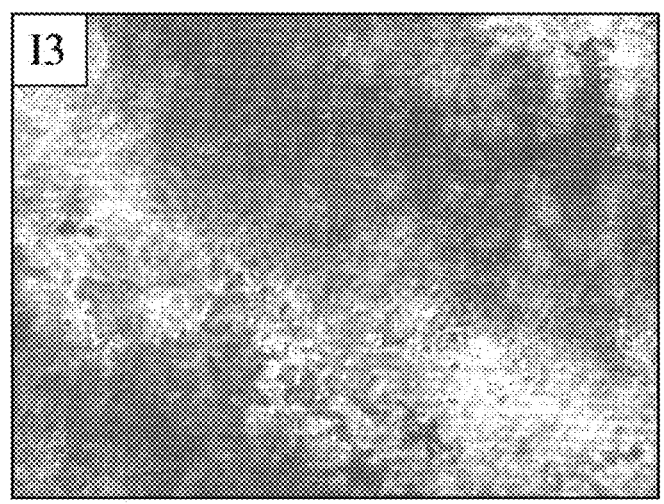
(b)
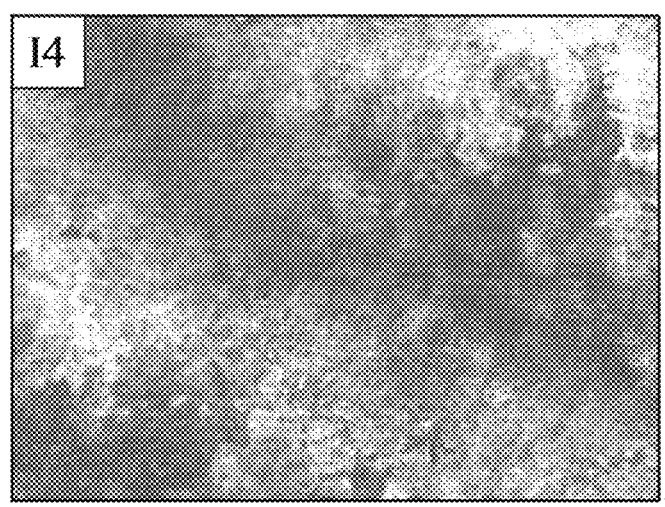

INTERFERENCE OBSERVATION DEVICE AND INTERFERENCE OBSERVATION METHOD

TECHNICAL FIELD

An aspect of the present invention relates to an interference observation apparatus and an interference observation method.

BACKGROUND ART

An interference observation apparatus for acquiring an interference image of an observation object causes light reflected by or transmitted through the observation object and reference light to interfere with each other using an optical system of a Michelson interferometer or a Mach-Zehnder interferometer, so that the interference image of the observation object can be acquired. The interference observation apparatus disclosed in Non Patent Document 1 uses an optical system of the Mach-Zehnder interferometer, and splits light output from a light source into first split light and second split light, transmits the first split light on the observation object, and combines the first split light and the second split light to acquire an image of the interference light generated by the combining.

CITATION LIST

Non Patent Literature

Non Patent Document 1: Christopher J. Mann, et al, "High-resolution quantitative phase-contrast microscopy by digital holography," OPTICS EXPRESS, Vol. 13, No. 22, pp. 8693-8698 (2005)

Non Patent Document 2: A. A. Freschi, et al, "Adjustable phase control in stabilized interferometry," OPTICS LETTERS, Vol. 20, No. 6, pp. 635-637 (1995)

Non Patent Document 3: Toyohiko Yamauchi, et al, "Low-coherent quantitative phase microscope for nanometer-scale measurement of living cells morphology," OPTICS EXPRESS, Vol. 16, No. 16, pp. 12227-12238 (2008)

Non Patent Document 4: Hidenao Iwai, et al, "Quantitative phase imaging using actively stabilized phase-shifting low-coherence interferometry," OPTICS LETTERS, Vol. 29, No. 20, pp. 2399-2401 (2004)

Non Patent Document 5: Ichirou Yamaguchi, et al, "Active phase-shifting interferometers for shape and deformation measurements," Opt. Eng., Vol. 35, No. 10, pp. 2930-2937 (1996)

SUMMARY OF INVENTION

Technical Problem

In a case where an optical system of a Mach-Zehnder interferometer is used, it is difficult to adjust and change an optical path difference between first split light and second split light from the splitting to the combining compared to a case where an optical system of a Michelson interferometer is used, and therefore, it is difficult to realize a white light interferometer and a phase shift interferometer of a wavelength sweep type. The interference observation apparatus disclosed in Non Patent Document 1 has no function of adjusting the optical path difference.

An aspect of the present invention has been made in order to solve the above problem, and an object thereof is to provide an interference observation apparatus and an interference observation method which can easily perform optical adjustment using an optical system of a Mach-Zehnder interferometer and can easily acquire an interference image of an observation object.

Solution to Problem

An interference observation apparatus according to an aspect of the present invention includes (1) a light source for laser light having a variable wavelength, (2) an interference optical system forming a Mach-Zehnder interferometer, and including a splitting beam splitter for splitting the laser light output from the light source to output first split light and second split light, and a combining beam splitter for combining the first split light and the second split light to output combined light, and (3) a control unit for controlling a wavelength of the laser light output from the light source to adjusts a phase difference between the first split light and the second split light at the combining by the combining beam splitter.

An interference observation method according to an aspect of the present invention includes (1) a step (light outputting step) of outputting laser light from a light source having a variable wavelength, (2) a step (light splitting step) of splitting the laser light output from the light source into first split light and second split light by a splitting beam splitter of an interference optical system forming a Mach-Zehnder interferometer, (3) a step (light combining step) of combining the first split light and the second split light by a combining beam splitter of the interference optical system to output combined light, and (4) a step (adjusting step) of controlling a wavelength of the laser light output from the light source to adjust a phase difference between the first split light and the second split light at the combining by the combining beam splitter.

Advantageous Effects of Invention

According to an aspect of the present invention, it is possible to easily perform optical adjustment using an optical system of a Mach-Zehnder interferometer, and to easily acquire an interference image of an observation object.

BRIEF DESCRIPTION OF DRAWINGS

FIG. 12 includes (a), (b) diagrams illustrating interference images before intensity correction obtained in the example.

FIG. 13 includes (a), (b) diagrams illustrating interference images before intensity correction obtained in the example.

FIG. 14 includes (a), (b) diagrams illustrating interference images after intensity correction obtained in the example.

FIG. 15 includes (a), (b) diagrams illustrating interference images after intensity correction obtained in the example.

DESCRIPTION OF EMBODIMENTS

Hereinafter, embodiments for carrying out the present invention will be described in detail with reference to the accompanying drawings. In the description of the drawings, the same elements will be denoted by the same reference signs, without redundant description.

The present invention is not limited to these examples.

First Embodiment

Figure 1:
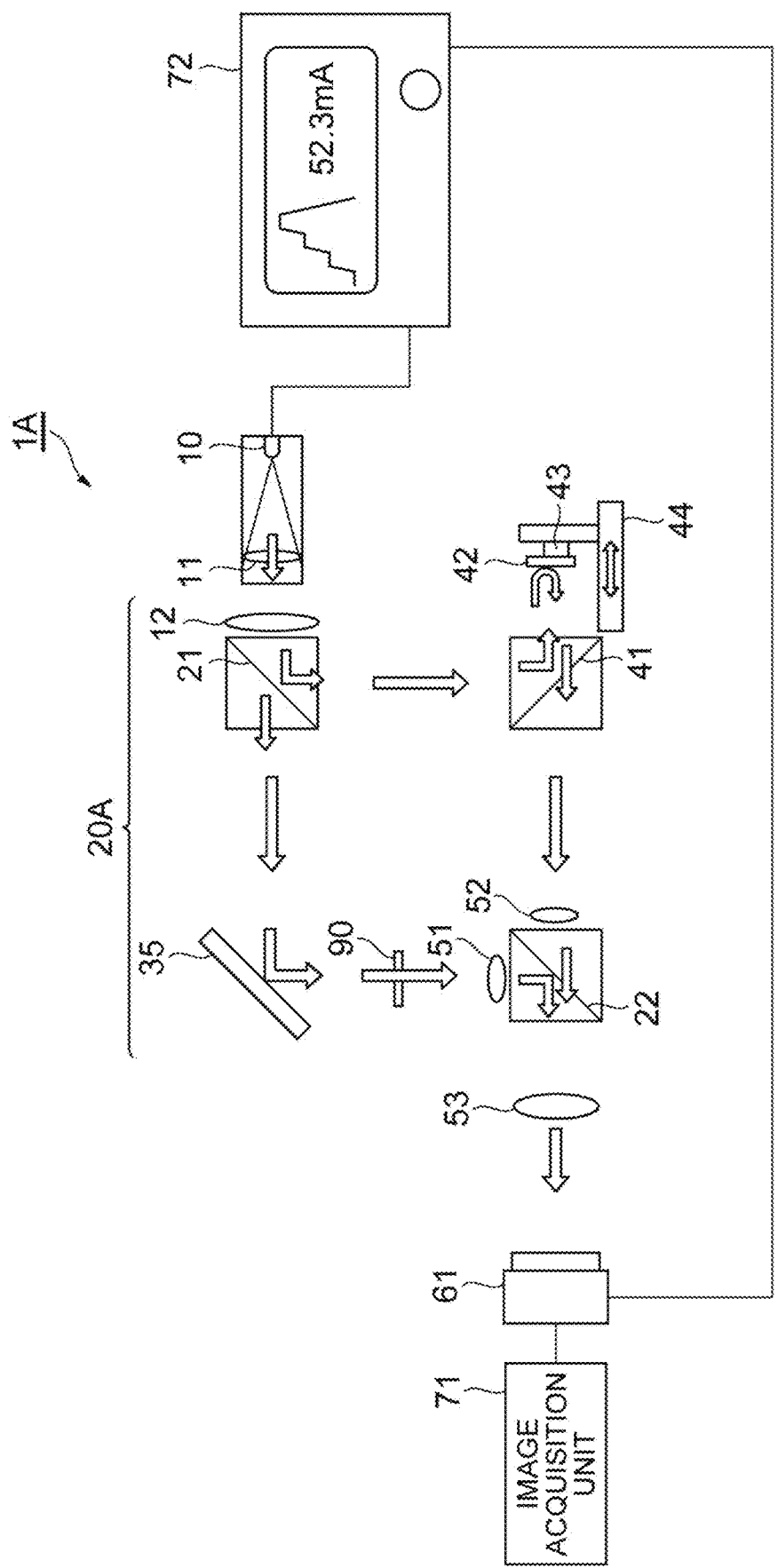
FIG. 1 is a diagram illustrating a configuration of an interference observation apparatus 1A of a first embodiment.

FIG. 1 is a diagram illustrating a configuration of an interference observation apparatus 1A of a first embodiment. The interference observation apparatus 1A includes a light source 10, a lens 11, a lens 12, a splitting beam splitter 21, a combining beam splitter 22, a mirror 35, a beam splitter 41, a mirror 42, a piezo element 43, a stage 44, a lens 51, a lens 52, a tube lens 53, a photodetector (light receiving unit) 61, an image acquisition unit 71, and a current control unit (control unit, controller) 72. An interference optical system 20A from the splitting beam splitter 21 to the combining beam splitter 22 forms a Mach-Zehnder interferometer. Further, the photodetector 61 may be, for example, an imaging unit.

The interference observation apparatus 1A acquires an interference image on the basis of the light transmitted through an observation object 90. The observation object 90 is not limited to a specific cell or a biological sample. For example, the observation object includes a cultured cell, an immortalized cell, a primary cultured cell, a cancer cell, a fat cell, a liver cell, a cardiac muscle cell, a nerve cell, a glia cell, a somatic stem cell, an embryonic stem cell, a pluripotential stem cell, an iPS cell, and a cell aggregation (spheroid) created on the basis of at least one of these cells. Further, the observation object is not limited to a biological object, and includes an industrial sample which can be measured in the transmission type configuration, for example, an inner portion of glass, an inner portion of a semiconductor element, a resin material, a liquid crystal, a high molecular compound, and an optical element.

The light source 10 outputs laser light. A wavelength of the laser light is variable, and the light source 10 can sweep the wavelength. The light source 10 may be configured to include a laser diode. The laser diode may be a spatial singlemode laser diode, or may be a spatial multimode laser diode. The lenses 11 and 12 condense the laser light output from the light source 10 to the observation object 90.

The splitting beam splitter 21 is optically coupled to the light source 10, inputs the laser light output from the light source 10 and passing through the lenses 11 and 12, and splits the laser light into two components to form first split light and second split light. The splitting beam splitter 21 may be, for example, a half mirror. The splitting beam splitter 21 outputs the first split light to the mirror 35 of an optical system on a measurement side, and outputs the second split light to the beam splitter 41 of an optical system on a reference side.

The mirror 35 provided in the optical system on the measurement side inputs the first split light output from the splitting beam splitter 21, and reflects the first split light to the combining beam splitter 22.

The beam splitter 41, the mirror 42, the piezo element 43, and the stage 44 are provided in the optical system on the reference side. The beam splitter 41 inputs the second split light output from the splitting beam splitter 21 to reflect the second split light to the mirror 42, and further, inputs the second split light reflected on the mirror 42 to transmit the second split light to the combining beam splitter 22. The beam splitter 41 may be, for example, a half mirror.

The piezo element 43 can move the mirror 42 in a direction perpendicular to a reflecting surface of the mirror 42. The stage 44 can move the mirror 42 and the piezo element 43 in the direction perpendicular to the reflecting surface of the mirror 42. The piezo element 43 and the stage 44 can adjust an optical path length in the optical system on the reference side, and can adjust an optical path difference between the first split light and the second split light.

The combining beam splitter 22 inputs the first split light which is reflected on the mirror 35 and passes through the observation object 90 and the lens 51, inputs the second split light which is output from the beam splitter 41 and passes through the lens 52, and combines the first split light and the second split light to output combined light. The combining beam splitter 22 may be, for example, a half mirror.

The tube lens 53 guides the combined light output from the combining beam splitter 22 toward the photodetector 61, and forms the combined light as an image on an imaging plane of the photodetector 61. The photodetector 61 receives the combined light and outputs a detection signal, and in particular, outputs the detection signal indicating an intensity distribution of the combined light on the imaging plane. The photodetector 61 is, for example, an image sensor such as a CCD area image sensor and a CMOS area image sensor.

The image acquisition unit 71 inputs the detection signal output from the photodetector 61, and acquires the interference image of the observation object 90 on the basis of the detection signal. The image acquisition unit 71 is configured to include an image processing processor such as a FPGA (Field Programmable Gate Array) and a GPU (Graphics Processing Unit). The image acquisition unit 71 is, for example, a computer such as a personal computer, a smart device (for example, a tablet terminal, etc.), and a cloud server. Further, the image acquisition unit 71 may include a display unit for displaying the interference image and the like.

The current control unit 72 is electrically coupled to the light source 10, and controls the wavelength of the laser light which is output from the light source 10 by adjusting a current supplied to the light source 10. With this configuration, the current control unit 72 can adjust a phase difference between the first split light and the second split light at the combining by the combining beam splitter 22.

In an interference observation method of the present embodiment, the interference image of the observation object 90 can be acquired using the interference observation apparatus 1A as follows.

In the interference optical system 20A which forms a Mach-Zehnder interferometer, the laser light output from the light source 10 is split by the splitting beam splitter 21 into two components to form the first split light and the second split light. Then, in the interference optical system 20A, the first split light which is reflected on the mirror 35 and transmits the observation object 90 and the second split light which passes through the beam splitter 41 and the mirror 42 are combined by the combining beam splitter 22, and the combined light is output from the combining beam splitter 22. The combined light is received by the photodetector 61, and the detection signal is output from the photodetector 61. The interference image of the observation object 90 is acquired by the image acquisition unit 71 on the basis of the detection signal.

In particular, in the present embodiment, the wavelength of the laser light output from the light source 10 is controlled by the current control unit 72, the phase difference between the first split light and the second split light when the combining beam splitter 22 performs combining is adjusted, and the interference image of the observation object 90 is acquired on the basis of the detection signal.

Next, the description will be given about a relation between the wavelength of the laser light and a phase difference. The optical path difference between the first split light and the second split light from the splitting beam splitter 21 to the combining beam splitter 22 is set to $\Delta L$. When the wavelength of the laser light is $\lambda_0$, a phase difference $\phi_0$ between the first split light and the second split light at the combining by the combining beam splitter 22 is represented by the following Formula (1). When the wavelength of the laser light is $\lambda_1$, a phase difference $\phi_1$ between the first split light and the second split light at the combining by the combining beam splitter 22 is represented by the following Formula (2). Here, mod(a, b) is a remainder (residue) when a is divided by b.

[Formula 1]

$$\phi_0 = 2\pi \cdot \mathrm{mod}\left(\frac{\Delta L}{\lambda_0}, 1\right) \quad (1)$$

[Formula 2]

$$\phi_1 = 2\pi \cdot \mathrm{mod}\left(\frac{\Delta L}{\lambda_1}, 1\right) \quad (2)$$

Therefore, a phase difference shift amount $\phi_{shift}$ between the first split light and the second split light when the wavelength of the laser light is changed from $\lambda_0$ to $\lambda_1$ is represented by the following Formula (3). As can be seen from the formula, in a case where the optical path difference $\Delta L=0$, the phase difference between the first split light and the second split light does not change even when the wavelength of the laser light is changed. In a case where the optical path difference $\Delta L \neq 0$, the phase difference between the first split light and the second split light changes when the wavelength of the laser light is changed, and the phase difference shift amount $\phi_{shift}$ is proportional to a product of the optical path difference $\Delta L$ and a wavelength change amount. That is, it is possible to realize the phase difference shift amount $\phi_{shift}$ which is proportional to the wavelength change amount.

[Formula 3]

$$\phi_{shift} = \phi_1 - \phi_0 = 2\pi \cdot \mathrm{mod}\left(\frac{\Delta L}{\lambda_1}, 1\right) - 2\pi \cdot \mathrm{mod}\left(\frac{\Delta L}{\lambda_0}, 1\right) = \\ 2\pi \cdot \mathrm{mod}\left(\frac{\Delta L}{\lambda_1} - \frac{\Delta L}{\lambda_0}, 1\right) = 2\pi \cdot \mathrm{mod}\left(\frac{\Delta L(\lambda_0 - \lambda_1)}{\lambda_0 \lambda_1}, 1\right) \quad (3)$$

Figure 2:
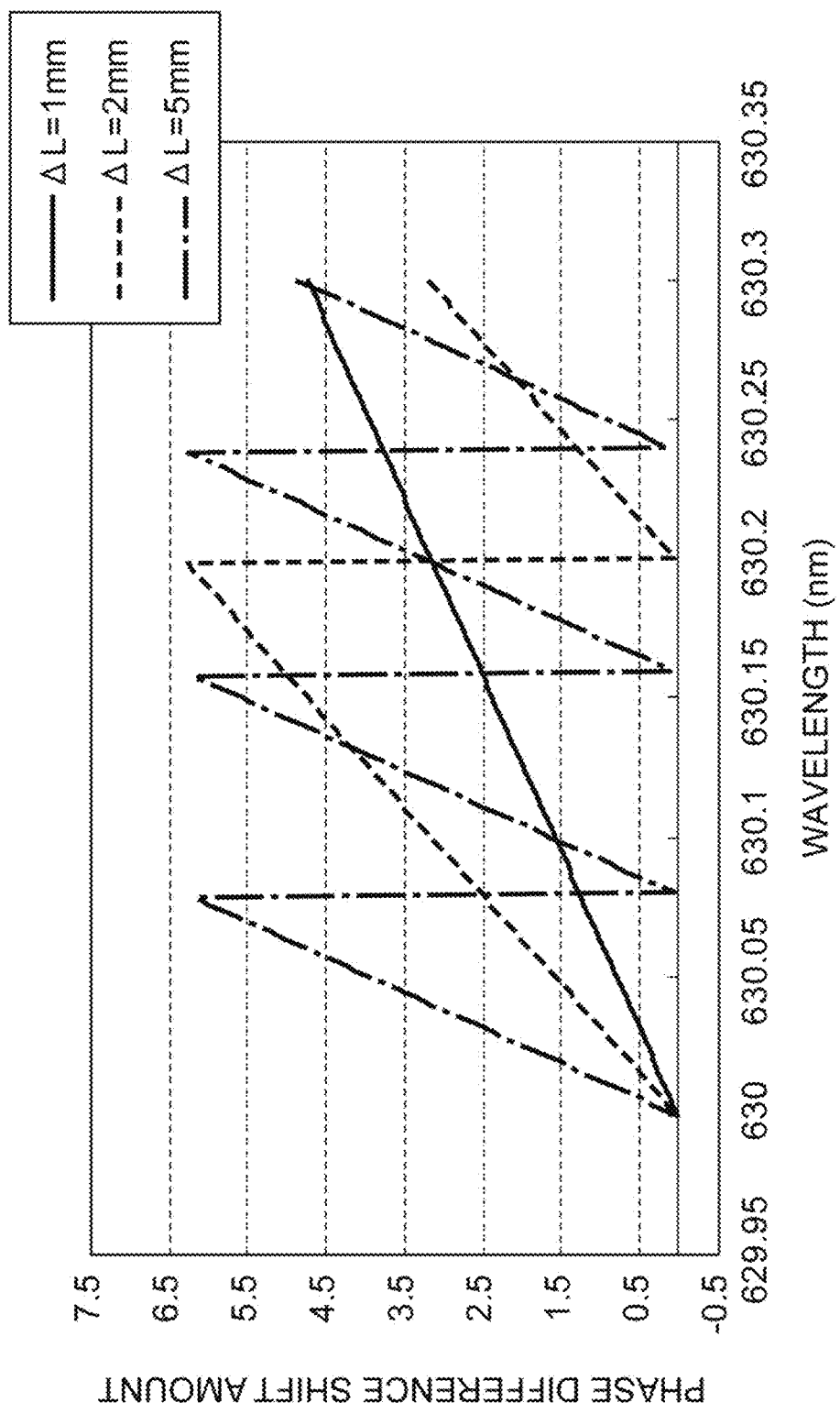
FIG. 2 is a graph illustrating an example of a relation between a laser light wavelength and a phase difference shift amount $\phi_{shift}$.

In a case where the light source 10 includes a laser diode, the wavelength of the laser light output from the light source 10 has a linear relation with a current supplied to the laser diode. FIG. 2 is a graph illustrating an example of a relation between the laser light wavelength and the phase difference shift amount $\phi_{shift}$. Herein, the laser light wavelength continuously changes from 630 nm to 630.3 nm, and the phase difference shift amount $\phi_{shift}$ is obtained by the above Formula (3) for each of the optical path differences $\Delta L=1$ mm, 2 mm, and 5 mm.

Here, in a phase shift interferometer, it is desirable that the phase difference between the first split light and the second split light at the time of the combining can shift within a range of 0 to $2\pi$. For example, when a variable range of the output light wavelength of the light source 10 is assumed as a range of 630 nm to 630.3 nm, a change width of the phase difference does not reach $2\pi$ when the optical path difference $\Delta L$ is 1 mm. As a result of calculation, the optical path difference $\Delta L$ is necessarily set to about 1.3 mm or more in order to set the change width of the phase difference to $2\pi$ or more.

On the other hand, in a case where the optical path difference $\Delta L$ is too long, the following defects are caused. For example, taking a case where the optical path difference $\Delta L$ is 13 mm into consideration, in this case, the variable range of the output light wavelength of the light source 10 may be set to 630 nm to 630.03 nm in order to set the change width of the phase difference to $2\pi$. A variable range of a current to be supplied to the light source 10 is set to 50 mA to 70 mA, and the wavelength is changed from 630 nm to 630.3 nm by adjusting the supply current. In a case where the wavelength is slightly changed from 630 nm to 630.03 nm, the supply current is minutely changed from 50 mA to 52 mA.

It is difficult to minutely change the current as described above with accuracy. The reason is that there is a need to equally divide the phase change into four parts within a range of 0 to $2\pi$ in the phase shift interferometry with accuracy and to shift the phase to be 0, $\pi/2$, $\pi$, and $3\pi/2$, and therefore, at least about a 1/100 accuracy is necessary with respect to the phase change width $2\pi$. In a case where the supply current is changed from 50 mA to 52 mA, there is needed a 20 µA accuracy corresponding to 1/100 of the supply current change width of 2 mA, and it is not easy to mount such a high accuracy current source. In addition, since an oscillation wavelength of the laser diode depends on a temperature of the laser diode, such an overlarge optical path difference $\Delta L$ acts as a weak condition with respect to a temperature change.

For the above reason, in the interference observation apparatus which sweeps the wavelength of the laser light, there is a need to set the optical path difference ΔL appropriately to the characteristics of the light source 10 to be used before measuring.

Further, in a case where the light source 10 includes a laser diode performing a longitudinal multimode oscillation, the appropriate setting of the optical path difference ΔL is more important. In the interference of the laser light of the longitudinal multimode oscillation, it has been known that the optical path difference which maximizes an interference degree appears in a discrete manner. For example, in the configuration illustrated in FIG. 1, the light source 10 includes the laser diode of the longitudinal multimode oscillation, the photodetector 61 is disposed, and the optical path difference ΔL is changed by the piezo element 43 or the stage 44.

Figure 3:
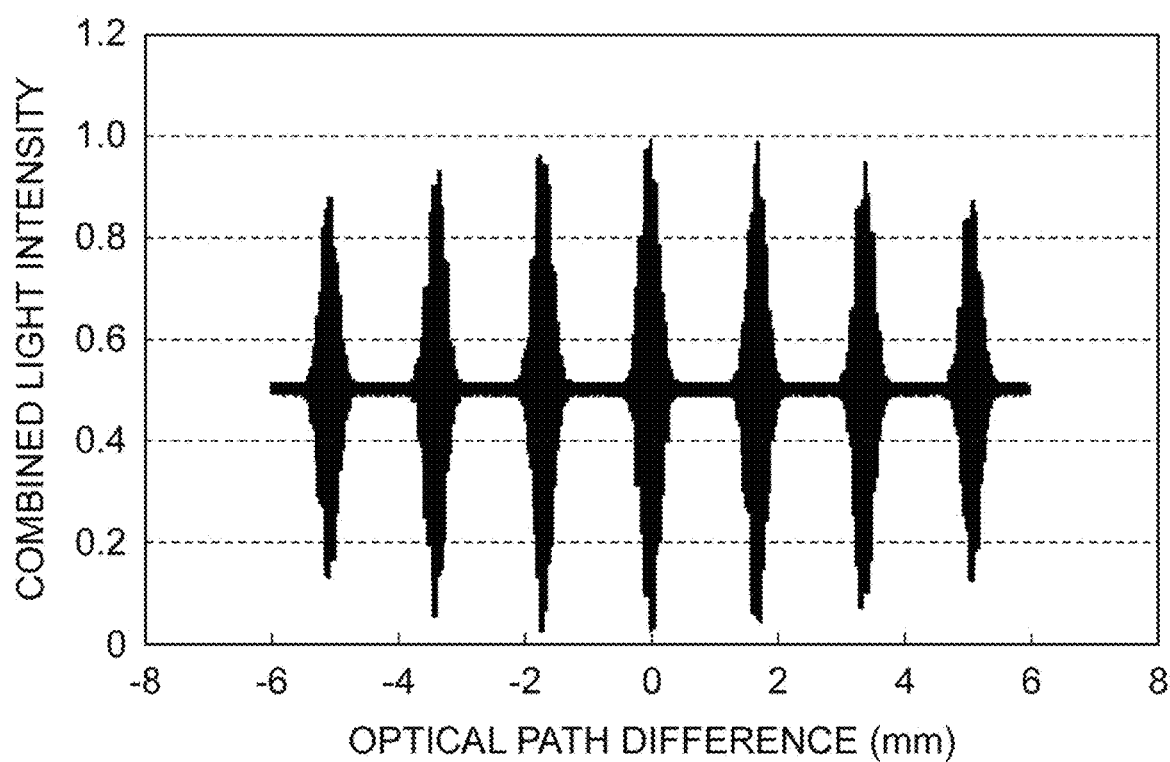
FIG. 3 is a graph illustrating an example of a relation between a combined light intensity and an optical path difference $\Delta L$ in a case where a light source 10 includes a laser diode of a longitudinal multimode oscillation.
Figure 4:
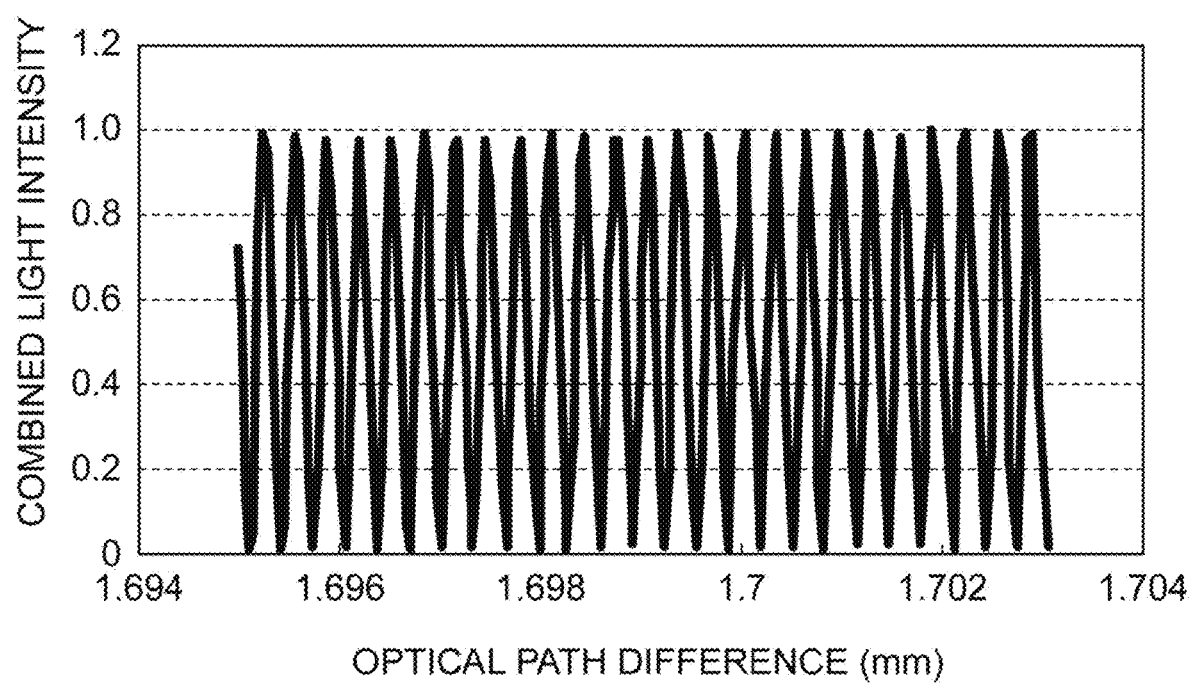
FIG. 4 is a graph illustrating a part of FIG. 3 magnified in the horizontal axis.
Figure 5:
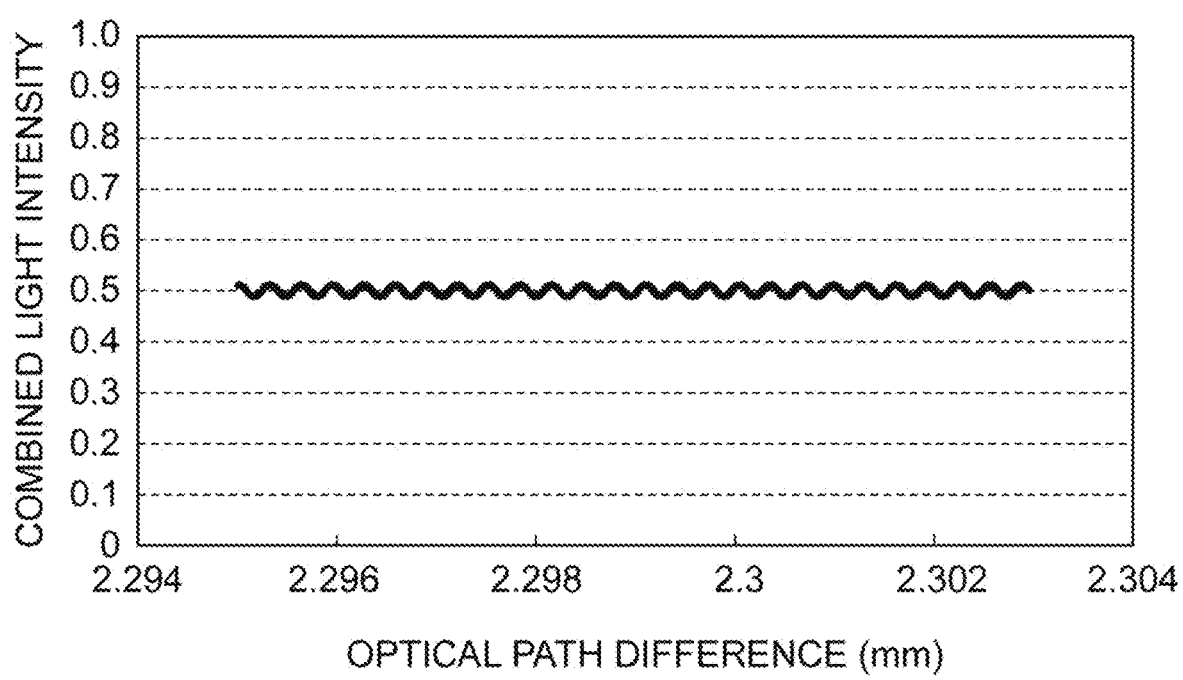
FIG. 5 is a graph illustrating a part of FIG. 3 magnified in the horizontal axis.

FIG. 3 is a graph illustrating an example of a relation between a combined light intensity which is detected by the photodetector and the optical path difference ΔL. FIG. 4 is a graph illustrating a portion near the optical path difference ΔL=1.7 mm in FIG. 3 magnified in the horizontal axis. FIG. 5 is a graph illustrating a portion near the optical path difference ΔL=2.3 mm in FIG. 3 magnified in the horizontal axis. As illustrated in these drawings, the interference signals are distinctly blinking near the optical path difference ΔL=1.7 mm, but the interference signals near the optical path difference ΔL=2.3 mm are not distinctly blinking. It is not preferable to observe the interference on a condition of the optical path difference when the interference signal is not distinctly blinking.

The optical path difference maximizing the interference degree appears almost in the same interval which varies depending on each laser diode. Therefore, in a case where the light source 10 includes a laser diode oscillating in a longitudinal multimode in a phase shift Mach-Zehnder interferometer using the light source 10 to sweep the wavelength, the optical path difference ΔL is necessarily adjusted to be an appropriate position in advance, or adjusted by a user whenever an interference is observed. Further, as described above, the optical path difference ΔL is not appropriate even if the difference is too short or too long for the balance with a wavelength modulation range of the light source 10, and therefore, a condition of the optical path difference ΔL for measurement is limited.

In the interference observation apparatus 1A illustrated in FIG. 1, the optical path difference ΔL can be set to an appropriate value by moving the mirror 42 using the piezo element 43 or the stage 44. The stage 44 can coarsely adjust the optical path difference ΔL, and the piezo element 43 can finely adjust the optical path difference ΔL. Then, the wavelength of the laser light output from the light source 10 is changed in a state where the optical path difference ΔL is set to an appropriate value, and thus, it is possible to adjust the phase difference between the first split light and the second split light at the combining by the combining beam splitter 22.

In the present embodiment, in the optical system of the Mach-Zehnder interferometer, the phase difference between the first split light and the second split light at the combining is adjusted by changing the wavelength of the laser light, and therefore, the optical adjustment can be made easily, and the interference image of the observation object 90 and a phase image can be acquired easily.

The phase image can be obtained using four interference images $I_1(x, y)$ to $I_4(x, y)$ with phase difference of $\pi/2$ different from each other. The interference image $I_2(x, y)$ is different in phase difference by $\pi/2$, the interference image $I_3(x, y)$ is different in phase difference by $\pi$, and the interference image $I_4(x, y)$ is different in phase difference by $3\pi/2$, from the phase difference when the interference image $I_1(x, y)$ is acquired as a reference. In general, a quantitative phase image $\Psi(x, y)$ can be obtained from the interference images $I_1$ to $I_4$ using the following Formula (4). Here, x and y are variables indicating positions in the images.

[Formula 4]

$$\psi(x, y) = \tan^{-1}\left(\frac{I_2(x, y) - I_4(x, y)}{I_1(x, y) - I_3(x, y)}\right) \quad (4)$$

However, when a current supplied to the laser diode is changed, a laser light intensity is also changed as well as the laser light wavelength. Therefore, the quantitative phase image $\Psi(x, y)$ obtained by the above Formula (4) contains an error caused by a non-constant laser light intensity between the interference images $I_1$ to $I_4$. Therefore, the interference images $I_1$ to $I_4$ are corrected using laser light intensities $P_1$ to $P_4$ at the time of acquiring the interference images $I_1$ to $I_4$ by the following Formulas (5a) to (5d). Then, a quantitative phase image $\Psi_C(x, y)$ is obtained from the corrected interference images $I_{1C}$ to $I_{4C}$ by the following Formula (6). Thus, it is possible to remove an error caused by a non-constant laser light intensity.

[Formula 5]

$$I_{1C} = I_1 / P_1 \quad (5a)$$

$$I_{2C} = I_2 / P_2 \quad (5b)$$

$$I_{3C} = I_3 / P_3 \quad (5c)$$

$$I_{4C} = I_4 / P_4 \quad (5d)$$

[Formula 6]

$$\psi_C(x, y) = \tan^{-1}\left(\frac{I_{2C}(x, y) - I_{4C}(x, y)}{I_{1C}(x, y) - I_{3C}(x, y)}\right) \quad (6)$$

The laser light intensities $P_1$ to $P_4$ at the time of acquiring the interference images $I_1$ to $I_4$ may be obtained using a detection result of backward output light of the laser diode by a monitoring photodetector built in the light source 10, or may be obtained using an average value of the receiving pixel values of the photodetector 61 in a state where any one of the first split light and the second split light is blocked. The respective values of the laser light intensities $P_1$ to $P_4$ may be obtained through measurement whenever the observation is made, or may be obtained through measurement when the apparatus is powered on. Further, in a case where the stability of the laser light output intensity of the light source 10 is reliable, the respective values of the laser light intensities $P_1$ to $P_4$ may be measured in advance at the time of factory shipment and stored in a storage unit of the apparatus, and then read out of the storage unit.

Second Embodiment

Figure 6:
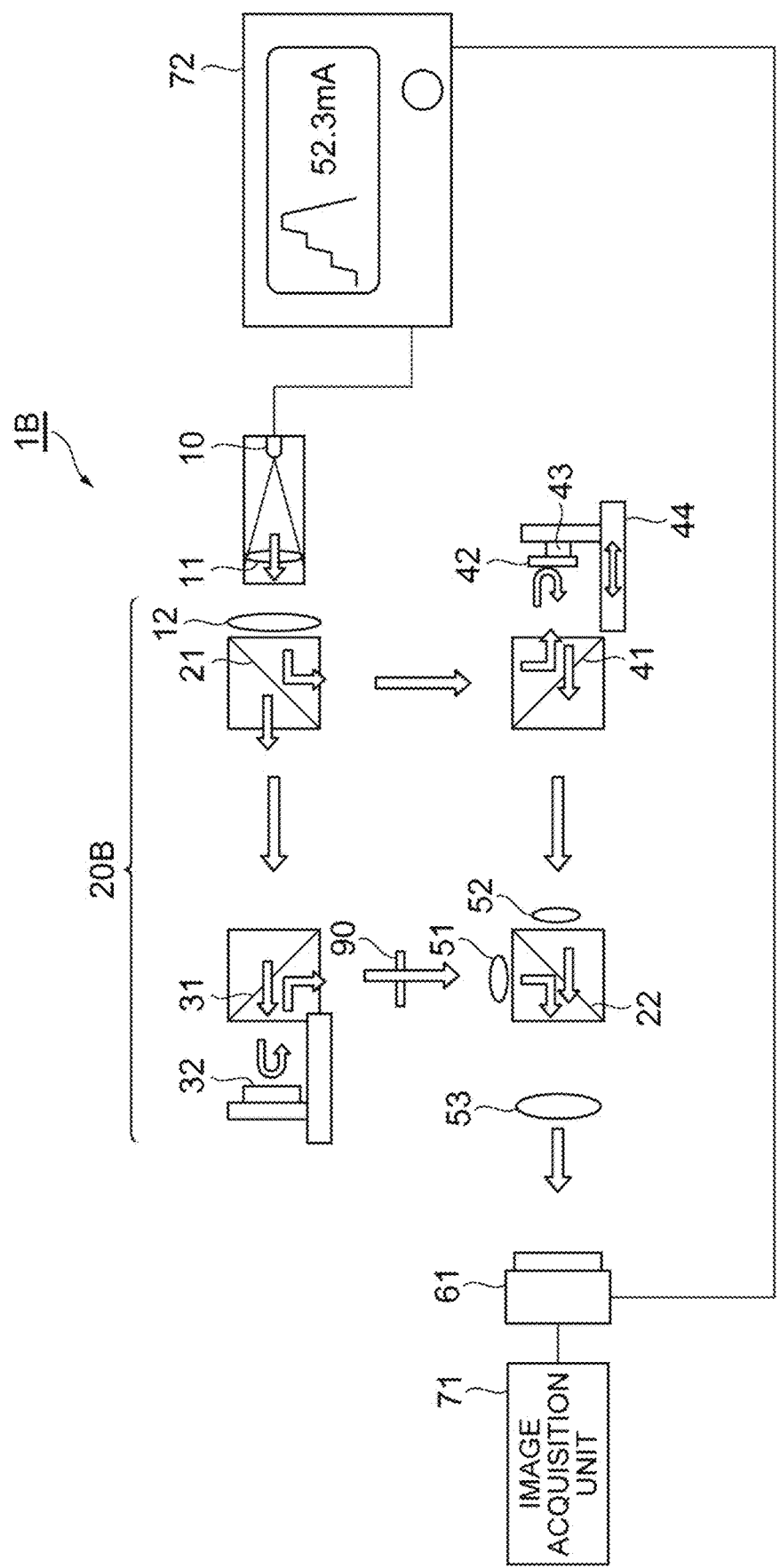
FIG. 6 is a diagram illustrating a configuration of an interference observation apparatus 1B of a second embodiment.

FIG. 6 is a diagram illustrating a configuration of an interference observation apparatus 1B of a second embodiment. The interference observation apparatus 1B includes the light source 10, the lens 11, the lens 12, the splitting beam splitter 21, the combining beam splitter 22, a beam splitter 31, a mirror 32, the beam splitter 41, the mirror 42, the piezo element 43, the stage 44, the lens 51, the lens 52, the tube lens 53, the photodetector (light receiving unit) 61, the image acquisition unit 71, and the current control unit (control unit, controller) 72. An interference optical system 20B from the splitting beam splitter 21 to the combining beam splitter 22 forms a Mach-Zehnder interferometer.

The interference optical system 20B of the interference observation apparatus 1B of the second embodiment illustrated in FIG. 6 includes the beam splitter 31 and the mirror 32, while the interference optical system 20A of the interference observation apparatus 1A of the first embodiment illustrated in FIG. 1 includes the mirror 35. The beam splitter 31 and the mirror 32 are provided in the optical system on the measurement side. The beam splitter 31 inputs the first split light output from the splitting beam splitter 21 and transmits the light toward the mirror 32, and further, inputs the first split light reflected on the mirror 32 and reflects the light toward the combining beam splitter 22. The beam splitter 31 may be, for example, a half mirror.

Here, there may be provided a piezo element which can move the mirror 32 in a direction perpendicular to a reflecting surface of the mirror 32. Further, there may be provided a stage which can move the mirror 32 and the piezo element in the direction perpendicular to the reflecting surface of the mirror 32.

In the present embodiment, the same effects as those of the first embodiment are obtained, and the following effects are obtained as well.

In the present embodiment, the first split light is reflected by the beam splitter 31 and the mirror 32, and thus the image is inverted twice. The second split light is reflected by the beam splitter 41 and the mirror 42, and thus the image is similarly inverted twice. As a result, the respective images of the first split light and the second split light at the combining by the combining beam splitter 22 are matched with each other in direction. In general, when the total number of times of image inversions by the respective reflections of the first split light and the second split light is an even number, the respective images of the first split light and the second split light are matched with each other in direction at the combining by the combining beam splitter 22.

When the respective images of the first split light and the second split light at the combining by the combining beam splitter 22 are matched to each other in direction, the first split light and the second split light can interfere with each other efficiently in a wide range of the imaging plane of the photodetector 61 even in a spatial multimode (transverse multimode).

Here, the first split light and the second split light become the transverse multimode, in a case where the light source 10 oscillates in the transverse multimode, and also in a case where the mode is changed to the transverse multimode by the optical system from the light source 10 up to the splitting beam splitter 21. For example, in a case where the laser light output from the light source 10 is guided by a multimode optical fiber to be incident on the splitting beam splitter 21, the laser light is changed into the transverse multimode during being guided by the multimode optical fiber even when the light source 10 oscillates in the transverse single-mode.

Further, in the present embodiment, the optical system on the measurement side (the optical system of the first split light) and the optical system on the reference side (the optical system of the second split light) have the configuration similarly to each other, and therefore, the adjustment can be made even when the optical path difference $\Delta L$ between the first split light and the second split light is close to the value 0. Therefore, the optical path difference $\Delta L$ is set with a high flexibility, and a variable range of the wavelength of the laser light output from the light source 10 is set with a high flexibility.

Further, in the present embodiment, the optical system on the measurement side (the optical system of the first split light) and the optical system on the reference side (the optical system of the second split light) have the configuration similarly to each other, and therefore, it is possible to suppress an influence of chromatic dispersion which appears in the combined light. Accordingly, a degradation of visibility of interference fringes relative to an ideal coherence function calculated from the output light spectrum of the light source 10 is suppressed.

In the configuration of the interference observation apparatus 1B, when the sample 90 is replaced with another sample, the thickness or the refractive index of the sample changes, and thus there may occur a need to move the stage 44 over a long distance. For example, in a case where a cover glass having a thickness of 170 μm is used as a sample, and 1.5 is assumed as a refractive index of glass, an increment of the optical path length generated in a case where there is a sample is 85 μm ($=170\times(1.5-1)$) compared to a case where there is no sample.

On the other hand, in a case where a plastic dish having a bottom thickness of 1 mm filled with water by a depth of 3 mm is used as the sample, 1.7 is assumed as a refractive index of plastic, and 1.33 is assumed as a refractive index of water, an increment of the optical path length generated in a case where there is a sample becomes 1690 μm ($=1000\times(1.7-1)+3000\times(1.33-1)$) compared to a case where there is no sample.

Therefore, in a case where the sample is changed from the cover glass to the plastic dish filled with water, an extra optical path difference of 1605 μm is generated. The stage 44 is necessarily moved by 802.5 μm in a direction of elongating the optical path length in order to compensate the optical path difference and to obtain an optical path difference which maximizes an interference degree with the same order as that before changing the sample. The movement of the stage by nearly 1 mm may cause a reduction of operability in a case where a manual stage is used for example, or there is a need to use a heavy stepping motor stage in a case where an automatic stage is used.

Figure 18:
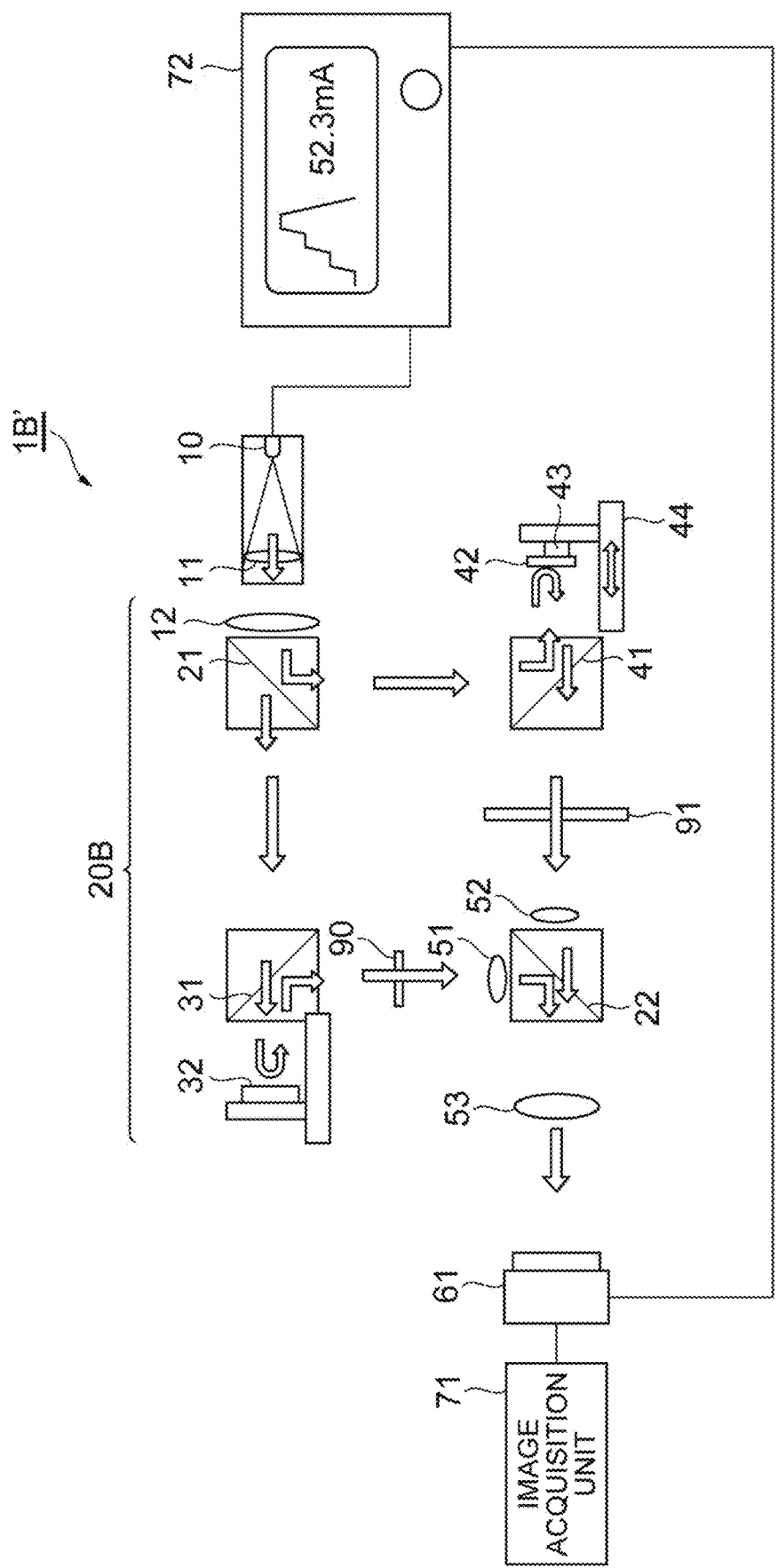
FIG. 18 is a diagram illustrating a configuration of an interference observation apparatus 1B' of the modification of the second embodiment.

Therefore, as a method for reducing the movement amount of the stage 44, it is possible to consider a configuration of an interference observation apparatus 1B' illustrated in FIG. 18 as a modification of the second embodiment. FIG. 18 is a diagram illustrating the configuration of the interference observation apparatus 1B' of the modification of the second embodiment. The interference observation apparatus 1B' includes an optical path length/dispersion compensating plate 91 on the optical system on the reference side in addition to the configuration of the interference observation apparatus 1B.

The optical path length/dispersion compensating plate 91 is formed to have almost the same optical path length using almost the same material as that of the using sample, in accordance with the variation of samples that the user use, and transmits the light. For example, in a case where the user uses the samples on which an object is coated or cultured on three types of holders, that is, a cover glass having a thickness of 170 μm, a slide glass having a thickness of 1 mm, and a container filled with water by a depth of 3 mm on a plastic dish having a bottom thickness of 1 mm, an optical path length/dispersion compensating plate A (for the cover glass), an optical path length/dispersion compensating plate B (for the slide glass), and an optical path length/dispersion compensating plate C (for the container filled with water on the plastic dish) may be prepared in advance as plates through which the light having the same optical path length as those of the holders transmits.

The optical path length/dispersion compensating plates A to C are prepared in advance, and for example, the optical path length/dispersion compensating plate A is inserted at an arbitrary position in a reference optical path in a case where the cover glass having a thickness of 170 µm is the holder, the optical path length/dispersion compensating plate B in the case where the slide glass having a thickness of 1 mm is the holder, and the optical path length/dispersion compensating plate C in the case where the container filled with water by a depth of 3 mm on the plastic dish having a bottom thickness of 1 mm is the holder, and therefore, even after the sample is changed, it is possible to obtain the optical path difference to maximize the interference degree similarly to that before the changing with the same order as that before the changing.

Here, even in a case where almost the same sample, for example, a commercially available cover glass having a nominal thickness of 170 µm, is used, it is not necessarily realized an optical path difference in which the interference degree is maximized only by inserting the optical path length/dispersion compensating plate 91 depending on a refractive index difference of a material due to a condition such as a manufacturing error and a temperature. For example, the cover glass having a nominal thickness of 170 µm may have a manufacturing error of ±10 µm. Further, in the case of the holder filled with water or a culture solution on the plastic dish, a measurement object such as a cell is observed in a state where the object is cultured on the bottom of the dish in practice, and therefore, the value of the optical path length varies depending on a thickness of the cell and a composition of the culture solution. Therefore, even in a case where the optical path length/dispersion compensating plate 91 is used, it does not mean that the stage 44 or a mechanical optical path difference adjusting mechanism similar to the stage is unnecessary.

In a case where the optical path length/dispersion compensating plate 91 is used, and a manual stage is used as the stage 44, the stage using a differential micrometer can be preferably used. The differential micrometer is a micrometer formed by integrating two adjusting mechanisms of a rough motion (a long distance can be moved, but a resolution is low) and a fine motion (only a short distance can be moved, but a resolution is high). At the time of factory shipment, the optical path difference is set to maximize the interference degree by the rough motion stage without a sample, and the rough motion stage is fixed. At the time of observation, the user inserts the optical path length/dispersion compensating plate 91 corresponding to the optical path length of the measurement sample, and after setting the optical path difference to almost maximize the interference degree, the optical path difference is adjusted to strictly maximize the interference degree using only the fine motion stage, and thus, it is possible to obtain the interference of the laser light with an appropriate interference degree. In the present embodiment, since the user operates only the fine motion stage, the adjustment range is narrow compared to a case where the rough motion stage is used, and there is a less possibility to miss a point at which the interference degree is maximized.

In a case where the optical path length/dispersion compensating plate 91 is used, and an automatic stage is used as the stage 44, it is preferably possible to use the stage in which the piezo element is used. The piezo element has an extension distance of about 100 µm in maximum. At the time of factory shipment, the optical path difference is designed and manufactured to maximize the interference degree when a predetermined laser light source is used in a state where there is no sample. At the time of observation, the user inserts the optical path length/dispersion compensating plate 91 corresponding to the optical path length of the measurement sample, and after setting the optical path difference to almost maximize the interference degree, the optical path difference is set to strictly maximize the interference degree using the stage 44 with the piezo element, and thus, it is possible to obtain the interference of the laser light with an appropriate interference degree. Further, in the case of the present embodiment, the piezo element 43 may be not necessary, and the function of the present invention may be realized only by the stage 44 using the piezo element.

Here, in the explanation of the present embodiment, the reason why the plate for correcting the optical path difference is called "optical path length/dispersion compensation plate" is that not only the optical path length but also an influence caused by dispersion in various samples can be compensated by inserting this optical plate. In the two-beam interferometer, the dispersions (=wavelength dependency of the optical path length) are equalized, so that it is possible to achieve the highest visibility of the interference fringes. As a secondary effect obtained by using the optical path length/dispersion compensating plate 91 in accordance with the type of the sample, the imaging can be performed in a state where the interference fringe has the high visibility.

Further, the optical path length/dispersion compensating plate 91 can exert the effect by being inserted at an arbitrary position in the reference optical path, and the optical path length/dispersion compensating plate 91 preferably inserted in the vicinity of the focal point on the light source side of the lens 52 in the optical system on the reference side, so that it is possible to reduce a wavefront aberration between the reference light and the object light. Further, more preferably, the insertion position of the optical path length/dispersion compensating plate 91 is in the vicinity of the focal point on the light source side of the lens 52 in the optical system on the reference side, and further, it is inserted at a position deviated toward the light source side or the photodetector side by several mm from the strict focal position (about several times the focal depth of the lens 52), so that it is possible to avoid that dust or the like in the surface of the optical path length/dispersion compensating plate 91 is reflected in the imaging plane of the photodetector 61. Further, in a case where the optical path length/dispersion compensating plate 91 is inserted into a turning portion for the adjustment of the optical path length (between the beam splitter 41 and the mirror 42), the reference light is transmitted twice through the optical path length/dispersion compensating plate 91, and therefore, it is desirable to use the optical path length/dispersion compensating plate 91 which is manufactured to have the half of the optical thickness of the measurement sample.

The configuration using the optical path length/dispersion compensating plate 91 can be implemented not only in the modification of the second embodiment but also in the modifications of the first embodiment described above and the third to sixth embodiments described below.

Third Embodiment

Figure 7:
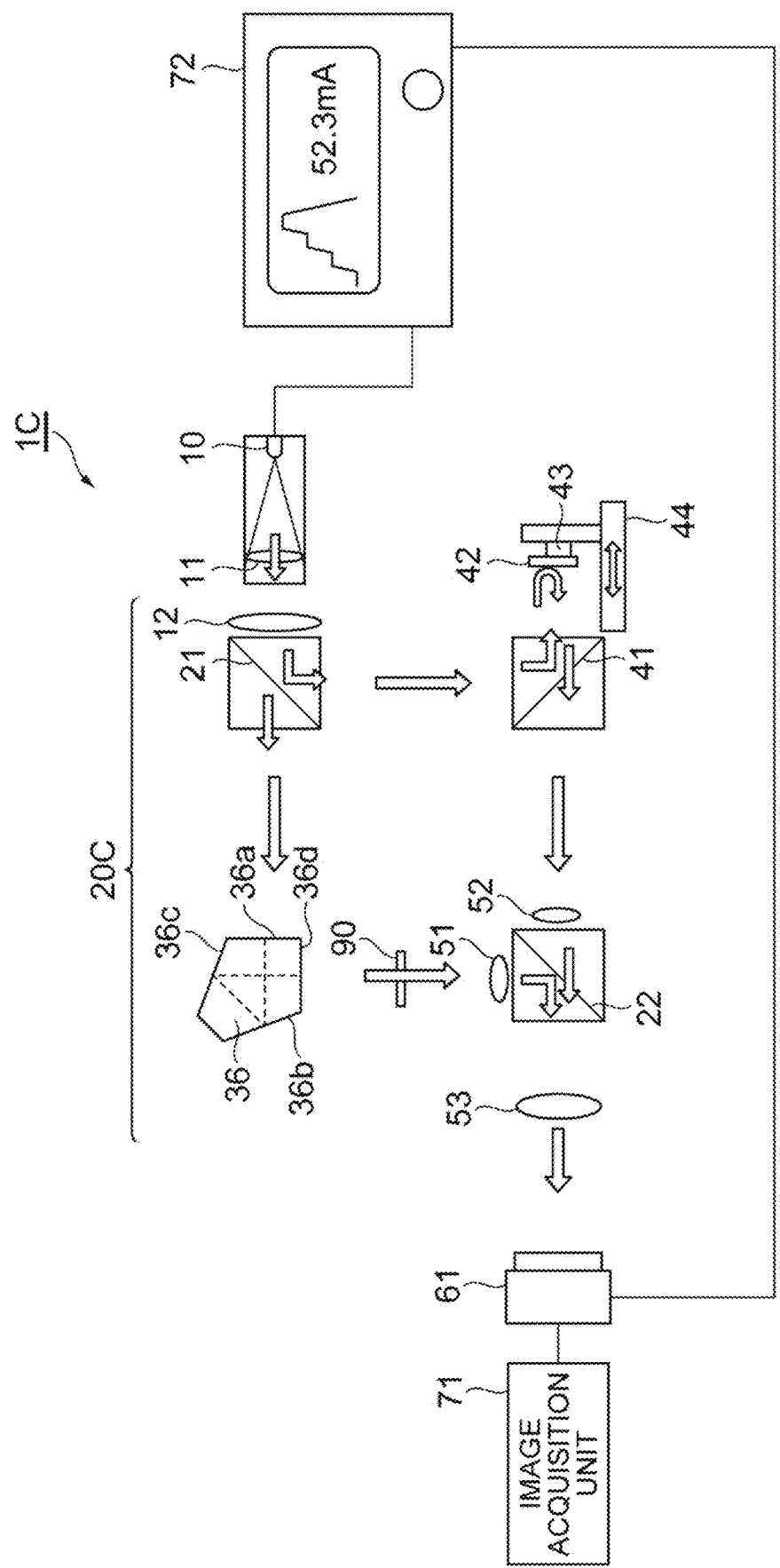
FIG. 7 is a diagram illustrating a configuration of an interference observation apparatus 1C of a third embodiment.

FIG. 7 is a diagram illustrating a configuration of an interference observation apparatus 1C of a third embodiment. The interference observation apparatus 1C includes the light source 10, the lens 11, the lens 12, the splitting beam splitter 21, the combining beam splitter 22, an image inverting prism 36, the beam splitter 41, the mirror 42, the piezo element 43, the stage 44, the lens 51, the lens 52, the tube lens 53, the photodetector (light receiving unit) 61, the image acquisition unit 71, and the current control unit (control unit, controller) 72. An interference optical system 20C from the splitting beam splitter 21 to the combining beam splitter 22 forms a Mach-Zehnder interferometer.

The interference optical system 20A of the interference observation apparatus 1A of the first embodiment illustrated in FIG. 1 includes the mirror 35, and the interference optical system 20C of the interference observation apparatus 1C of the third embodiment illustrated in FIG. 7 is different in that there is provided with the image inverting prism 36. The image inverting prism 36 is provided in the optical system on the measurement side. The image inverting prism 36 is, for example, a penta prism.

The image inverting prism 36 is a polygonal pillar prism which includes a first side surface 36a, a second side surface 36b, a third side surface 36c, and a fourth side surface 36d. The image inverting prism 36 transmits the first split light arrived from the splitting beam splitter 21 into the inside from the first side surface 36a, and reflect the first split light sequentially on the second side surface 36b and the third side surface 36c, and then, the first split light is transmitted from the fourth side surface 36d to the outside, and output to the combining beam splitter 22.

In the present embodiment, the same effects as those of the first embodiment are obtained, and the following effects are obtained as well.

In the present embodiment, the first split light is reflected by the image inverting prism 36 twice, and thus the image is inverted twice. The second split light is reflected by the beam splitter 41 and the mirror 42, and thus the image is similarly inverted twice. Similarly to the case of the second embodiment, since the total number of times of image inversions by the respective reflections of the first split light and the second split light is an even number, the respective images of the first split light and the second split light at the combining by the combining beam splitter 22 are matched to each other in direction, and the first split light and the second split light can interfere with each other efficiently in a wide range of the imaging plane of the photodetector 61 even in a spatial multimode (transverse multimode).

Further, in the present embodiment, similarly to the case of the second embodiment, the adjustment can be made even when the optical path difference ΔL between the first split light and the second split light is close to the value 0. Therefore, the optical path difference ΔL is set with a high flexibility, and a variable range of the wavelength of the laser light output from the light source 10 is set with a high flexibility.

Fourth Embodiment

Figure 8:
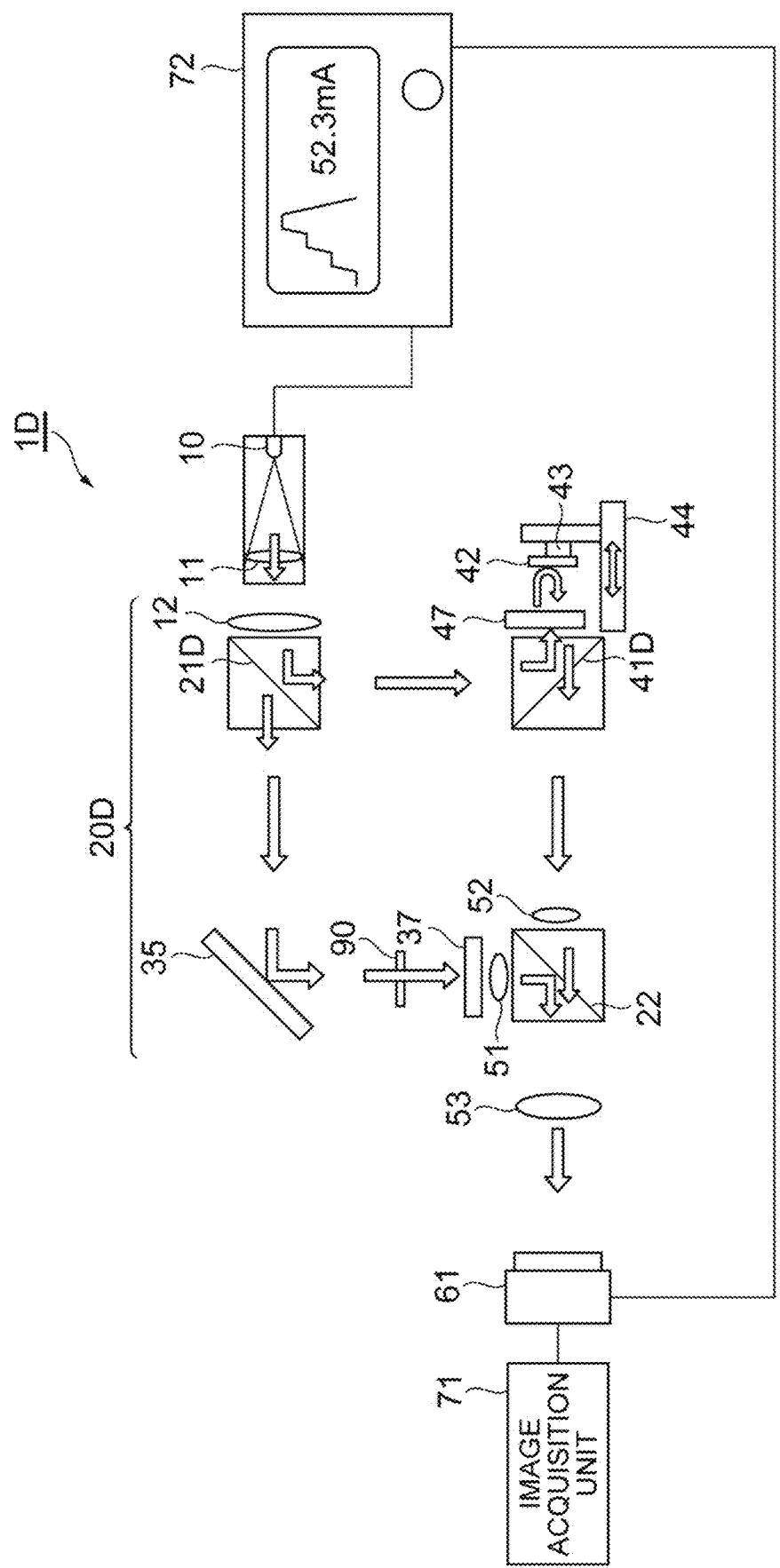
FIG. 8 is a diagram illustrating a configuration of an interference observation apparatus 1D of a fourth embodiment.

FIG. 8 is a diagram illustrating a configuration of an interference observation apparatus 1D of a fourth embodiment. The interference observation apparatus 1D includes the light source 10, the lens 11, the lens 12, a splitting beam splitter 21D, the combining beam splitter 22, the mirror 35, an optical rotator 37, a beam splitter 41D, the mirror 42, the piezo element 43, the stage 44, an optical rotator 47, the lens 51, the lens 52, the tube lens 53, the photodetector (light receiving unit) 61, the image acquisition unit 71, and the current control unit (control unit, controller) 72. An inter-ference optical system 20D from the splitting beam splitter 21D to the combining beam splitter 22 forms a Mach-Zehnder interferometer.

The interference observation apparatus 1D of the fourth embodiment illustrated in FIG. 8 is different from the configuration of the interference observation apparatus 1A of the first embodiment illustrated in FIG. 1 in that the splitting beam splitter 21D is provided instead of the splitting beam splitter 21, the beam splitter 41D is provided instead of the beam splitter 41, and the optical rotator 37 and the optical rotator 47 are further included.

The splitting beam splitter 21D is a polarization beam splitter. The splitting beam splitter 21D inputs the laser light which is output from the light source 10 and passes through the lenses 11 and 12, and splits the laser light into a p-polarized component and an s-polarized component. The splitting beam splitter 21D transmits and outputs the first split light (the p-polarized component) to the mirror 35, and reflects and outputs the second split light (the s-polarized component) to the beam splitter 41D.

The beam splitter 41D is also a polarization beam splitter. The beam splitter 41D inputs the second split light (the s-polarized component) output from the splitting beam splitter 21D, and reflects the light to the mirror 42. The optical rotator 47 is provided on the optical path of the second split light between the beam splitter 41D and the mirror 42. The optical rotator 47 may be, for example, a Faraday rotator. The optical rotator 47 and the mirror 42 may be integrally formed, and may be configured by, for example, a Faraday mirror.

The optical rotator 47 rotates a polarization plane of the second split light which passes from the beam splitter 41D to the mirror 42 by 45°, and further, rotates a polarization plane of the second split light which passes from the mirror 42 to the beam splitter 41D by 45°. Therefore, the second split light input from the optical rotator 47 to the beam splitter 41D becomes the p-polarized component. The beam splitter 41D transmits the second split light (the p-polarized component) to output to the combining beam splitter 22.

The optical rotator 37 is provided on the optical path of the second split light between the observation object 90 and the combining beam splitter 22. The optical rotator 37 may be, for example, a Faraday rotator. The optical rotator 37 rotates a polarization plane of the first split light. The first split light is p-polarized light before transmitting the observation object 90, and may be different from the p-polarized light after transmitting the observation object 90. The first split light and the second split light are desirably set to be equal in polarization direction in order to efficiently perform interference of the first split light and the second split light by the combining by the combining beam splitter 22. Then, the optical rotator 37 matches the polarization directions of the first split light and the second split light to each other at the time of the combining by the combining beam splitter 22 by rotating the polarization plane of the first split light as much angle as necessary. An intensity of the combined light may be monitored while changing the rotating angle of the polarization plane of the first split light by the optical rotator 37 in order to match the polarization directions of the first split light and the second split light to each other such that the rotating angle of the polarization plane of the first split light is adjusted to maximize the intensity of the combined light.

In the present embodiment, the same effects as those of the first embodiment are obtained, and the following effects are obtained as well. In the present embodiment, the polarization beam splitters are used as the splitting beam splitter 21D and the beam splitter 41D, and the optical rotator 47 is provided on the optical path of the second split light between the beam splitter 41D and the mirror 42, so that a loss of light amount of the second split light can be suppressed.

Fifth Embodiment

Figure 9:
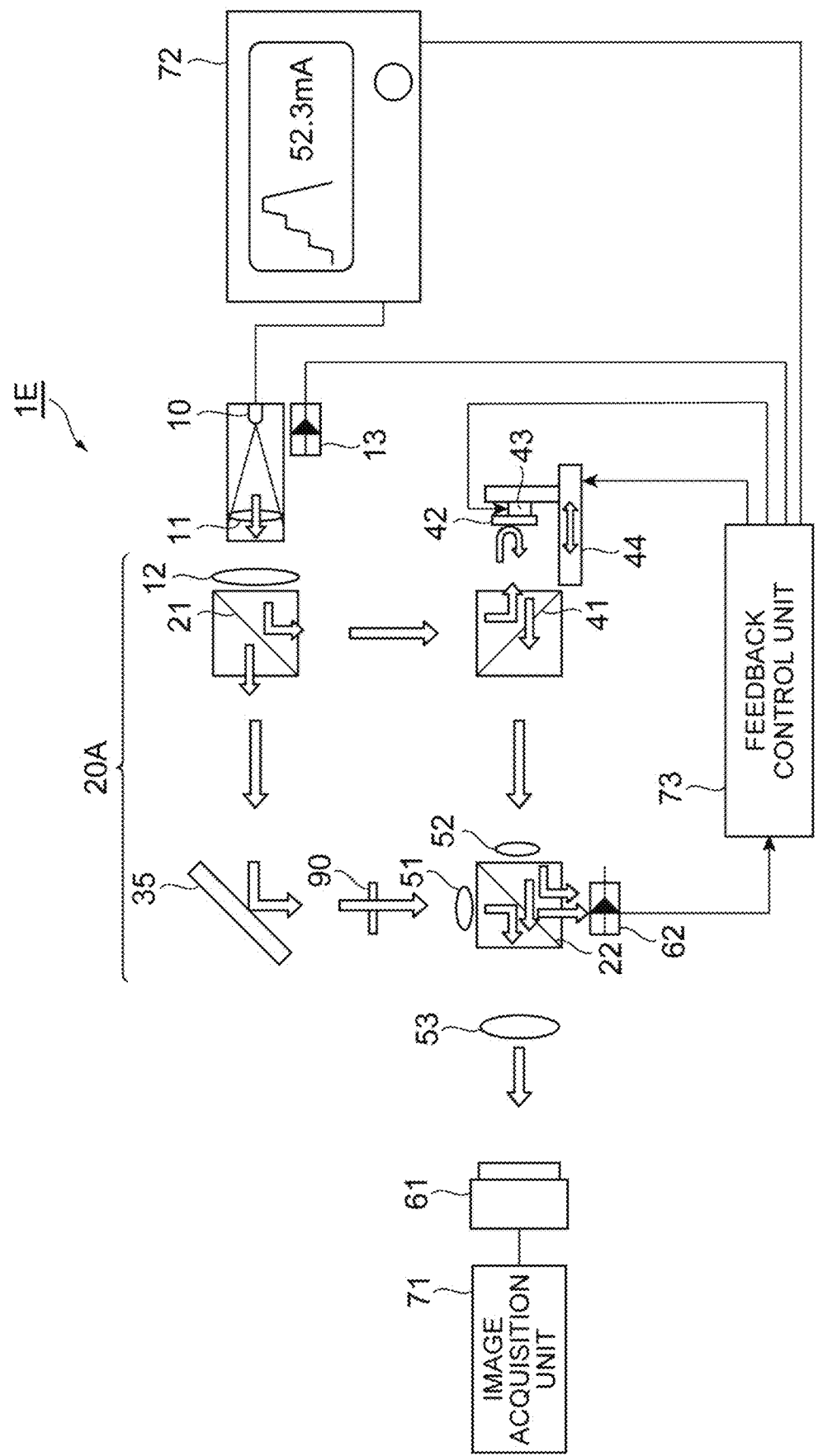
FIG. 9 is a diagram illustrating a configuration of an interference observation apparatus 1E of a fifth embodiment.

FIG. 9 is a diagram illustrating a configuration of an interference observation apparatus 1E of a fifth embodiment. The interference observation apparatus 1E includes the light source 10, the lens 11, the lens 12, a monitor photodetector 13, the splitting beam splitter 21, the combining beam splitter 22, the mirror 35, the beam splitter 41, the mirror 42, the piezo element 43, the stage 44, the lens 51, the lens 52, the tube lens 53, the photodetector (light receiving unit) 61, a photodetector (light receiving unit) 62, the image acquisition unit 71, the current control unit (control unit, controller) 72, and a feedback control unit (control unit, controller) 73. The interference optical system 20A from the splitting beam splitter 21 to the combining beam splitter 22 forms a Mach-Zehnder interferometer.

The interference observation apparatus 1E of the fifth embodiment illustrated in FIG. 9 is different from the configuration of the interference observation apparatus 1A of the first embodiment illustrated in FIG. 1 in that the monitor photodetector 13, the photodetector 62, and the feedback control unit 73 are further included.

The monitor photodetector 13 detects the intensity of the laser light output from the light source 10, and outputs a detection signal. In a case where the light source 10 includes a laser diode, the monitor photodetector 13 may detect the intensity of backward output light of the laser diode.

The combining beam splitter 22 combines the first split light and the second split light, outputs a part of the combined light to the photodetector 61, and outputs a part thereof to the photodetector 62. The photodetector 62 receives the combined light, and outputs a detection signal indicating the intensity of the combined light. The photodetector 62 is, for example, a photodiode or a photomultiplier tube.

The feedback control unit 73 drives both or any one of the piezo element 43 and the stage 44 to control the position of the mirror 42 so as to adjust the optical path difference on the basis of a combined light intensity indicated by the detection signal output from the photodetector 62, or controls the laser light wavelength using the supply current from the current control unit 72 to the light source 10 to adjust the phase difference. At the time of control, the feedback control unit 73 preferably corrects the combined light intensity indicated by the detection signal output from the photodetector 62 on the basis of the laser light intensity indicated by the detection signal output from the monitor photodetector 13.

In the present embodiment, a deviation of the phase difference generated by disturbance in the optical system is detected, the feedback control unit 73 performs a phase lock and a phase shift by controlling the position of the mirror 42 or controlling the laser light wavelength, and the interference image and the phase image of the observation object 90 are acquired. Here, a technique of keeping the phase difference between the first split light and the second split light at the time of the combining is called "phase lock", and further, a technique of changing a value of the optical path difference which is kept by the phase lock by the feedback control is called "phase shift". Further, the disturbance described herein includes not only mechanical vibrations of the optical system but also the deviation of the optical path length caused by the vibration of a boundary between the liquid surface and the air in a case where the observation object 90 is a cell in a liquid. The control by the feedback control unit 73 will be described in detail below.

As the phase lock, the techniques disclosed in Non Patent Documents 2, 3, and 4 (hereinafter, referred to as "first phase lock technique") may be used. In the phase lock technique disclosed in these Non Patent Documents, the mirror 42 vibrates at a high speed in a sinusoidal wave with an amplitude sufficiently smaller than the wavelength of the output light of the light source 10, and at this time, the detection signal output from the photodetector 62 is synchronously detected using one and two times the vibration frequency of the mirror 42, so that a phase of the interference light is obtained. The feedback control unit 73 performs feedback control to make the obtained phase value approach a target value, so that the phase difference can be locked.

The feedback control unit 73 inputs the detection signal which is an analog signal from the photodetector 62, and outputs an analog signal to control the piezo element 43 or the stage 44 to be driven. The feedback control unit 73 may perform an analog process in the inside, or may perform a digital process. In the latter case, for example, the feedback control unit 73 may perform an AD conversion on the input detection signal into a digital signal, process the digital signal, perform a DA conversion on the digital signal obtained by the processing to obtain an analog signal, and output the analog signal. In the processing of the digital signal, a microprocessor and an FPGA (Field Programmable Gate Array) may be used.

When the phase difference between the first split light and the second split light at the time of the combining is $\Delta\phi$, the intensity V of the light received by the photodetector 62 is expressed by the following Formula (7). The light receiving intensity V includes an offset component DC and an amplitude AC which are all unknown.

Therefore, there is a need to extract the phase difference $\Delta\phi$ where the DC and the AC are not contained by a certain process.

[Formula 7]

$$V = DC + AC \cdot \sin(\Delta\phi) \quad (7)$$

When the mirror 42 vibrates with the piezo element 43 at a high speed in a sinusoidal wave with an amplitude sufficiently smaller than the wavelength of the output light of the light source 10, the intensity V of the light received by the photodetector 62 is expressed by the following Formula (8). $\alpha$ is a modulation degree which is determined according to amplitude of the vibration of the mirror 42. $\omega$ is an angular frequency of the vibration. t is a time variable.

[Formula 8]

$$V = DC + AC \cdot \sin(\Delta\phi + \alpha \cdot \sin(\omega t)) \quad (8)$$

When the right side of Formula (8) is expanded in a Fourier series, the following Formulas (9a) to (9c) are obtained as approximation formulas. $J_1$ and $J_2$ are Bessel functions of the first kind. The second term of the right side of Formula (9a) vibrates at the amplitude $A_{\omega t}$ and the angular frequency $\omega$. Further, the third term of the right side of Formula (9a) vibrates at the amplitude $A_{2\omega t}$ and the angular frequency $2\omega$. Therefore, the detection signal output from the photodetector 62 is synchronously detected at the angular frequency a to obtain the amplitude $A_{\omega t}$, and the detection signal is synchronously detected at the angular frequency $2\omega$ to obtain the amplitude $A_{2\omega t}$.

[Formula 9]

$$V(t) = DC' + A_{\omega t} \sin(\omega t) + A_{2\omega t} \cos(2\omega t) + \ldots \quad (9a)$$

$$A_{\omega t} = 2 \cdot AC \cdot J_1(\alpha) \cdot \cos(\Delta\phi) \quad (9b)$$

$$A_{2\omega t} = 2 \cdot AC \cdot J_2(\alpha) \cdot \sin(\Delta\phi) \quad (9c)$$

A ratio of the amplitude $A_{\omega t}$ and the amplitude $A_{2\omega t}$ is expressed by the following Formula (10). Further, the AC indicates the interference intensity of the combined light, and the interference intensity AC is expressed by the following Formula (11). Since the amplitude of the vibration of the mirror 42 is constant, $J_1(\alpha)$ and $J_2(\alpha)$ can be obtained on the basis of the amplitude. The phase difference $\Delta\phi$ in accordance with the optical path difference can be obtained on the basis of Formula (10), and the interference intensity AC can be obtained on the basis of Formula (11). The feedback control unit 73 includes a synchronous detection circuit, an adding circuit, and a multiplying and dividing circuit in order to perform the above processes.

[Formula 10]

$$\frac{A_{2\omega t}}{A_{\omega t}} = \frac{2 \cdot AC \cdot J_2(\alpha) \cdot \sin(\Delta\phi)}{2 \cdot AC \cdot J_1(\alpha) \cdot \cos(\Delta\phi)} = \frac{J_2(\alpha)}{J_1(\alpha)} \tan(\Delta\phi) \quad (10)$$

[Formula 11]

$$AC^2 = \left(\frac{A_{\omega t}}{2 \cdot J_1(\alpha)}\right)^2 + \left(\frac{A_{2\omega t}}{2 \cdot J_2(\alpha)}\right)^2 \quad (11)$$

The phase lock technique (hereinafter, referred to as "second phase lock technique") using the "spatial filtering detector" disclosed in Non Patent Document 5 can also be employed. In the technique, the photodetector 62 uses a one-dimensional photodetector (light receiving unit). As such a one-dimensional photodetector, for example, there are a line sensor, a multi-anode photomultiplier tube, and a plurality of photodetectors arranged in one-dimensional direction. In the following, the description will be given about a case where four photodetectors are arranged at an equal interval. An inclination is given to both or any one of the optical system on the measurement side and the optical system on the reference side to make interference fringes appear, and in this state, the inclination of the interference fringes is adjusted to set the light receiving intensities $V_1$ to $V_4$ of four photodetectors to be obtained as the following Formulas (12a) to (12d).

[Formula 12]

$$V = DC + AC \cdot \sin(\Delta\phi) \quad (12a)$$

$$V = DC + AC \cdot \sin(\Delta\phi + \pi/2) = DC - AC \cdot \cos(\Delta\phi) \quad (12b)$$

$$V = DC + AC \cdot \sin(\Delta\phi + \pi) = DC - AC \cdot \sin(\Delta\phi) \quad (12c)$$

$$V = DC + AC \cdot \sin(\Delta\phi + 3\pi/2) = DC + AC \cdot \cos(\Delta\phi) \quad (12d)$$

In order to apply the inclination to both or any one of the optical system on the measurement side and the optical system on the reference side, for example, the mirror 35 or the mirror 42 may be inclined, or any one of the lenses may be inclined, or a wedge-shaped prism having different thicknesses along a predetermined direction may be inserted on the optical path.

$A_1$ and $A_2$ are obtained by the following Formulas (13a) and (13b) on the basis of the light receiving intensities $V_1$ to $V_4$, and a ratio of $A_1$ and $A_2$ is obtained by the following Formula (14). Further, the interference intensity AC is expressed by the following Formula (15). From these formulas, the phase difference $\Delta\phi$ corresponding to the optical path difference can be obtained, and the interference intensity AC can also be obtained. The feedback control unit 73 can realize the above processes with a simple electric circuit system.

[Formula 13]

$$A_1 = V_1 - V_3 = 2 \cdot AC \cdot \sin(\Delta\phi) \quad (13a)$$

$$A_2 = V_4 = 2 \cdot AC \cdot \cos(\Delta\phi) \quad (13b)$$

[Formula 14]

$$\frac{A_1}{A_2} = \frac{2 \cdot AC \cdot \sin(\Delta\phi)}{2 \cdot AC \cdot \cos(\Delta\phi)} = \tan(\Delta\phi) \quad (14)$$

[Formula 15]

$$AC^2 = \left(\frac{A_1}{2}\right)^2 + \left(\frac{A_2}{2}\right)^2 \quad (15)$$

Further, when performing the phase lock by the first phase lock technique, the feedback control unit 73 may perform a sinusoidal modulation on the optical path difference by vibrating the mirror 42 at a high speed in a sinusoidal manner by driving the piezo element 43 or the stage 44 in order to obtain the phase difference $\Delta\phi$ according to the above Formulas (7) to (11) on the basis of the detection signal output from the photodetector 62, and further, may perform the sinusoidal modulation on the laser light wavelength by modulating the current supplied from the current control unit 72 to the light source 10 at a high speed in a sinusoidal manner.

Further, when performing the phase lock by the first phase lock technique or the second phase lock technique, the feedback control unit 73 may adjust the optical path difference by driving the piezo element 43 or the stage 44 to control the position of the mirror 42 in order to keep the obtained phase difference $\Delta\phi$ constant, and further, may adjust the laser light wavelength by controlling the current supplied from the current control unit 72 to the light source 10.

For example, when performing the phase lock by the first phase lock technique, the feedback control unit 73 may obtain the phase difference $\Delta\phi$ on the basis of the detection signal output from the photodetector 62 by modulating the current supplied from the current control unit 72 to the light source 10 at a high speed in a sinusoidal manner so as to keep the phase difference $\Delta\phi$ constant by controlling the current supplied from the current control unit 72 to the light source 10. In this case, the current supplied from the current control unit 72 to the light source 10 is a current obtained such that an offset current for the phase shift is corrected according to the phase difference $\Delta\phi$ and is superimposed with a small amplitude, high-speed, and sinusoidal modulation current.

As described above, in a case where the light source 10 includes a laser diode, not only the laser light wavelength but also the laser light intensity is changed when the current supplied to the laser diode is changed. Therefore, in a case where the current supplied from the current control unit 72 to the light source 10 is modulated at a high speed in a sinusoidal manner, or in a case where the current is controlled to keep the phase difference Δϕ constant, the feedback control unit 73 preferably divides the combined light intensity indicated by the detection signal output from the photodetector 62 by the laser light intensity indicated by the detection signal output from the monitor photodetector 13, and performs the phase lock on the basis of the combined light intensity after division.

Sixth Embodiment

Figure 10:
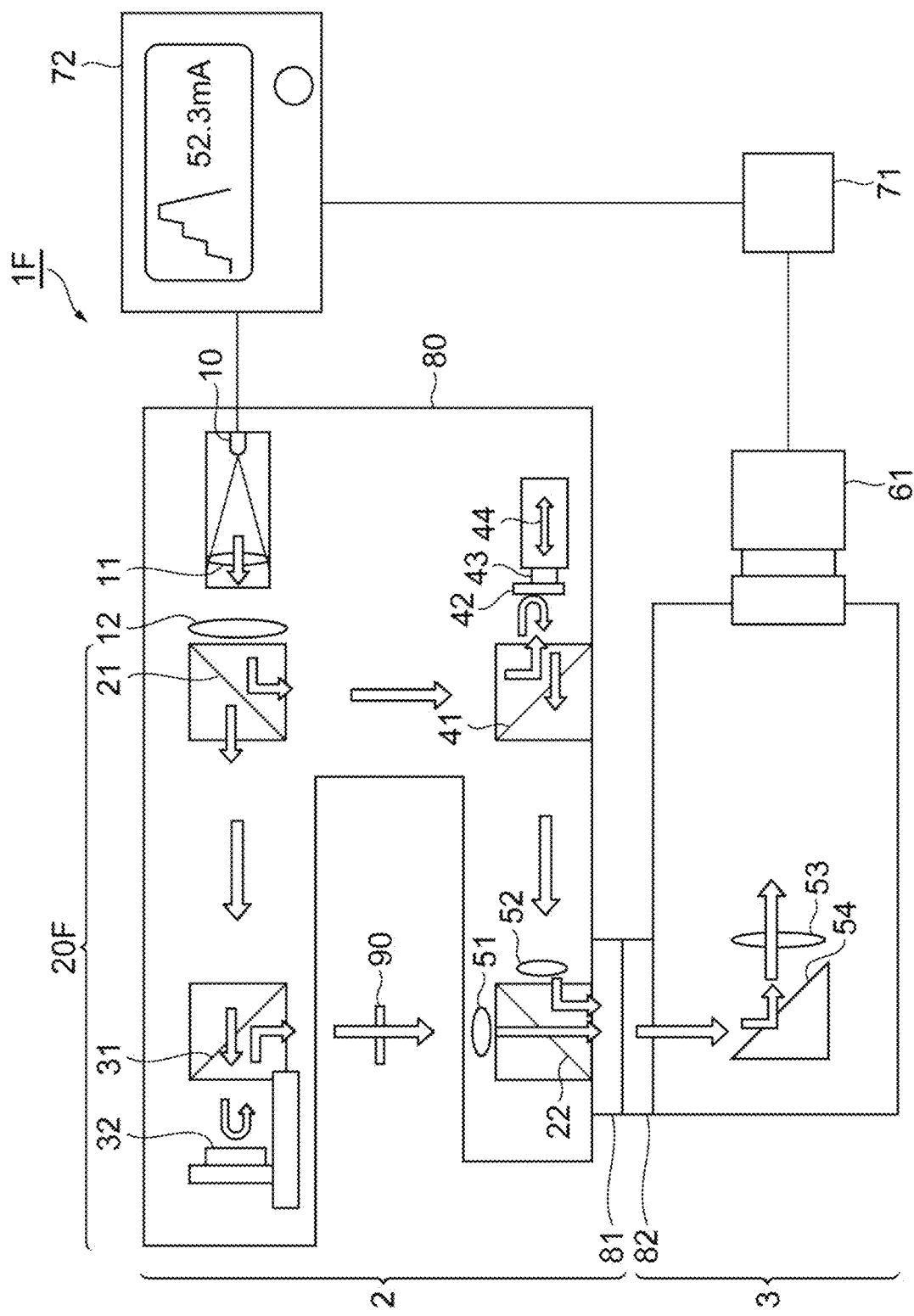
FIG. 10 is a diagram illustrating a configuration of an interference observation apparatus 1F of a sixth embodiment.

FIG. 10 is a diagram illustrating a configuration of an interference observation apparatus 1F of a sixth embodiment. The interference observation apparatus 1F includes the light source 10, the lens 11, the lens 12, the splitting beam splitter 21, the combining beam splitter 22, the beam splitter 31, the mirror 32, the beam splitter 41, the mirror 42, the piezo element 43, the stage 44, the lens 51, the lens 52, the tube lens 53, the photodetector (light receiving unit) 61, the image acquisition unit 71, and the current control unit (control unit, controller) 72. An interference optical system 20F from the splitting beam splitter 21 to the combining beam splitter 22 in the present embodiment forms a Mach-Zehnder interferometer, and has the configuration similar to that of the interference optical system 20B in the second embodiment.

In the present embodiment, the light source 10 and the interference optical system 20F are held by a housing 80. Further, a first attachment portion 81 is provided in the housing 80. The first attachment portion 81 includes an opening for outputting the combined light output from the combining beam splitter 22 of the interference optical system 20F to the outside. The light source 10, the interference optical system 20F, the housing 80, and the first attachment portion 81 form together an interference optical apparatus 2.

Further, in the present embodiment, the tube lens 53, the photodetector 61, a mirror 54, and a second attachment portion 82 form together a microscope apparatus 3. The second attachment portion 82 includes an opening which is optically coupled to the opening of the first attachment portion 81, and freely performs the optical coupling with the first attachment portion 81. The photodetector 61 receives the combined light output from the interference optical system 20F and outputs a detection signal. The combined light output from the interference optical system 20F is received by the photodetector 61 through the opening of the first attachment portion 81, the opening of the second attachment portion 82, the mirror 54, and the tube lens 53. A commercially available apparatus may be used as the microscope apparatus 3. That is, an attachment portion for attaching an objective lens in the normal commercially available microscope apparatus may be used as the second attachment portion 82.

The interference observation apparatus 1F of the present embodiment may be configured by assembling the normal microscope apparatus 3 and the interference optical apparatus 2 in which the light source 10 and the interference optical system 20F are held by the housing 80 to be reduced in size and integrated. In the present embodiment, since the existing microscope apparatus 3 may be used, the interference observation apparatus 1F may be configured at a low cost.

In the present embodiment, the beam splitter 31, the observation object 90, the combining beam splitter 22, the opening of the first attachment portion 81, and the opening of the second attachment portion 82 are aligned vertically in a single line. Therefore, when the observation object 90 is illuminated by an illuminating device provided above the beam splitter 31, a bright field image of the observation object 90 can be acquired by the photodetector 61. Further, in a case where the microscope apparatus 3 is a fluorescence microscope, the observation object 90 is illuminated and excited by an excitation illuminating device provided below the combining beam splitter 22, so that a fluorescence image of the observation object 90 can be acquired by the photodetector 61.

Further, similarly to the configuration of the present embodiment, even in the interference observation apparatuses 1A to 1E of the first to fifth embodiments, the interference optical systems 20A to 20E from the splitting beam splitter 21 to the combining beam splitter 22 and the light source 10 may be held by the housing to form the interference optical apparatus, and the interference optical apparatus and the microscope apparatus 3 may be optically coupled to each other.

Example

Figure 11:
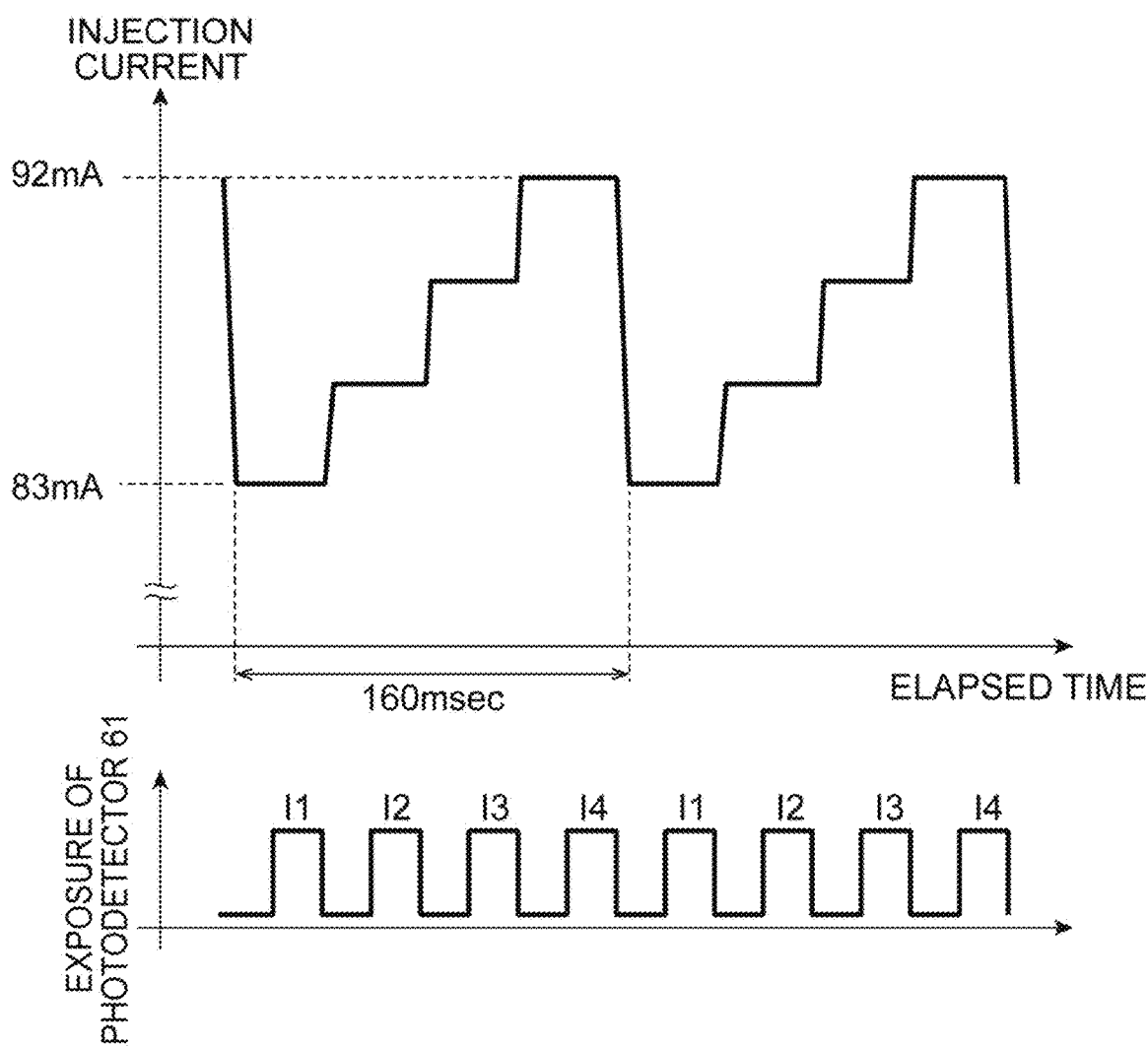
FIG. 11 is a graph illustrating a temporal variation of a current supplied to the laser diode of the light source 10 and an imaging period of a photodetector 61 in an example.

The description will be given about an example using the interference observation apparatus 1B having the configuration illustrated in FIG. 6. In this example, a glass plate with lines drawn with an oil-based ink is used as the observation object 90. A multimode laser diode having an oscillation wavelength of 638 nm is used as the light source 10. FIG. 11 is a graph illustrating a temporal variation of a current supplied to the laser diode of the light source 10 and an imaging period of the photodetector 61 in the example. As illustrated in the drawing, the temporal variation of the current supplied to the light source 10 is set to a modulation waveform of four steps. A minimum value of the supply current is set to 83 mA, a maximum value of the supply current is set to 92 mA, and a step width is set to 3 mA. One period of the modulation waveform is set to 160 msec, a period of each step is set to 40 msec, and an exposure time of the photodetector 61 is set to 20 msec. The optical path difference between the first split light and the second split light is set to about 12 mm.

FIG. 12 and FIG. 13 include diagrams illustrating the interference images before intensity correction. An interference image $I_2(x, y)$ illustrated in (b) in FIG. 12 is different in phase by $\pi/2$, an interference image $I_3(x, y)$ illustrated in (a) in FIG. 13 is different in phase by $\pi$, and an interference image $I_4(x, y)$ illustrated in (b) in FIG. 13 is different in phase by $3\pi/2$, from an interference image $I_1(x, y)$ illustrated in (a) in FIG. 12. It can be seen from these images that the phase of the interference fringes is modulated by modulating the supply current.

Further, before imaging, only the second split light is received by the photodetector 61 in a state where the optical path of the first split light is blocked, and an intensity modulation amount of the laser light is investigated. As a result, the intensity of the laser light is set to 88.1, 92.5, 94.6, and 94.9 in an arbitrary unit, in an ascending order of the supply current. Interference fringe images in FIG. 12 and FIG. 13 are divided by the intensity modulation amount with the above Formulas (5a) to (5d), and the interference images are obtained after intensity correction.

FIG. 14 and FIG. 15 include diagrams illustrating the interference images after intensity correction. An interference image $I_2(x, y)$ illustrated in (b) in FIG. 14 is different in phase by $\pi/2$, an interference image $I_3(x, y)$ illustrated in (a) in FIG. 15 is different in phase by it, and an interference image $I_4(x, y)$ illustrated in (b) in FIG. 15 is different in phase by $3\pi/2$, from an interference image $I_1(x, y)$ illustrated in (a) in FIG. 14.

Figure 16:
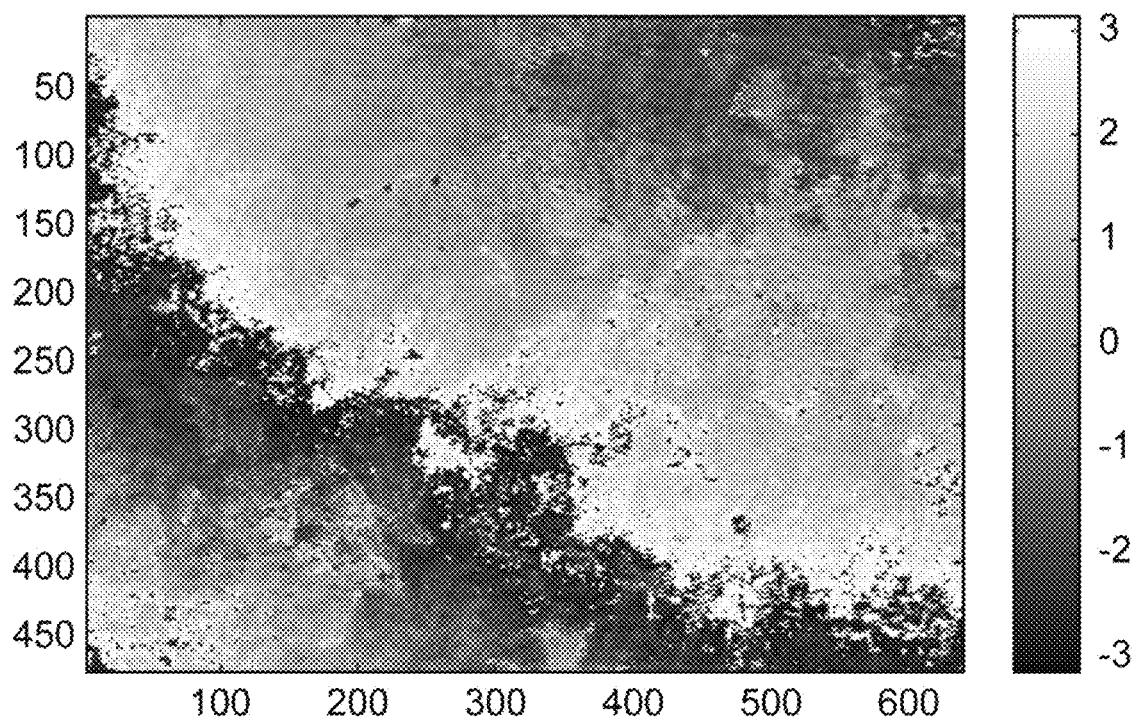
FIG. 16 is a diagram illustrating a phase image before phase unwrapping process obtained in the example.
Figure 17:
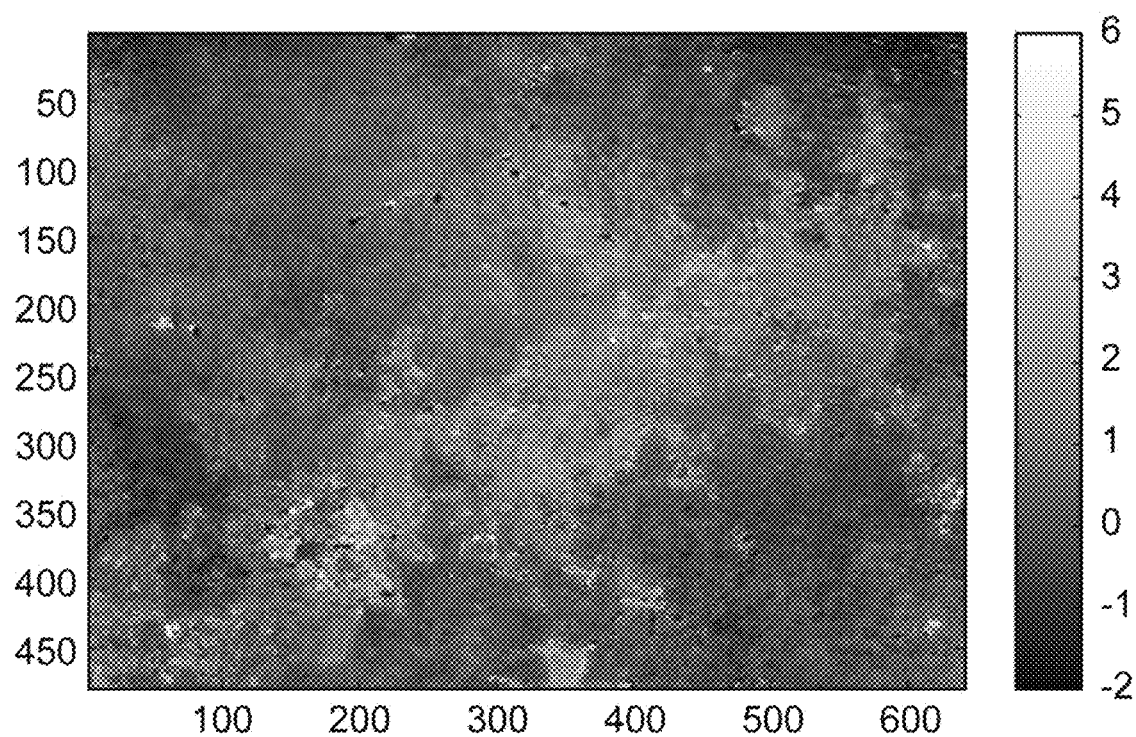
FIG. 17 is a diagram illustrating a phase image after phase unwrapping process obtained in the example.

The quantitative phase image $\Psi(x, y)$ is obtained from the interference images $I_1$ to $I_4$ in FIG. 14 and FIG. 15 by the above Formula (6). The image $\Psi(x, y)$ is subjected to phase unwrapping process, and a distortion component of the background is flattened by the calculation of the shading correction using a Zernike polynomial, so that the quantitative phase image is obtained. FIG. 16 is a diagram illustrating a phase image before phase unwrapping process. FIG. 17 is a diagram illustrating a phase image after phase unwrapping process.

In FIG. 17, a long region (a low concentration region) of the optical path length from the left lower portion to the right upper portion is a trace of the ink of the oil-based pen drawn on the glass plate of the observation object 90. In this way, it is possible to obtain the interference image and the quantitative phase image which are shifted in phase by modulating the supply current of the multimode laser diode.

The interference observation apparatus and the interference observation method according to the present invention are not limited to the embodiments and the configuration examples described above, and various modifications can be made.

The interference observation apparatus according to the above embodiment is configured to include (1) a light source for outputting laser light with a variable wavelength, (2) an interference optical system forming a Mach-Zehnder interferometer, and including a splitting beam splitter for splitting the laser light output from the light source to output first split light and second split light, and a combining beam splitter for combining the first split light and the second split light to output combined light, and (3) a control unit for controlling a wavelength of the laser light output from the light source to adjust a phase difference between the first split light and the second split light at the combining by the combining beam splitter.

Further, the interference observation apparatus according to the above embodiment is configured to include (1) a light source for laser light having a variable wavelength, (2) an interference optical system forming a Mach-Zehnder interferometer, and including a splitting beam splitter for splitting the laser light output from the light source to output first split light and second split light, and a combining beam splitter for combining the first split light and the second split light to output combined light, and (3) a control unit for controlling a wavelength of the laser light output from the light source to adjust a phase difference between the first split light and the second split light at the combining by the combining beam splitter.

The interference observation apparatus may be configured to further include a light receiving unit for receiving the combined light and outputting a detection signal.

The interference observation apparatus may be configured to further include an image acquisition unit for acquiring an interference image of an observation object placed on the optical path of the first split light or the second split light on the basis of the detection signal.

The interference observation apparatus may be configured to include (1) a housing for holding the light source and the interference optical system, (2) a first attachment portion provided in the housing and having an opening for outputting the combined light output from the interference optical system to the outside, and (3) a microscope apparatus including a second attachment portion having an opening optically coupled to the opening of the first attachment portion, and a light receiving unit for receiving the combined light output from the interference optical system through the opening of the first attachment portion and the opening of the second attachment portion and outputting a detection signal.

The interference observation method according to the above embodiment is configured to include (1) outputting laser light from a light source having a variable wavelength, (2) in an interference optical system forming a Mach-Zehnder interferometer, splitting the laser light output from the light source by a splitting beam splitter to output first split light and second split light, and combining the first split light and the second split light by a combining beam splitter to output combined light, (3) receiving the combined light by a light receiving unit to output a detection signal, and (4) controlling a wavelength of the laser light output from the light source to adjust a phase difference between the first split light and the second split light at the combining by the combining beam splitter, and acquiring an interference image of an observation object placed on an optical path of the first split light or the second split light on the basis of the detection signal.

Further, the interference observation method according to the above embodiment is configured to include (1) outputting laser light from a light source having a variable wavelength, (2) splitting the laser light output from the light source into first split light and second split light by a splitting beam splitter of an interference optical system forming a Mach-Zehnder interferometer, (3) combining the first split light and the second split light by a combining beam splitter of the interference optical system to output combined light, and (4) controlling a wavelength of the laser light output from the light source to adjust a phase difference between the first split light and the second split light at the combining by the combining beam splitter.

The interference observation method may further include (5) a step (detection step) of receiving the combined light by a light receiving unit and outputting a detection signal, and (6) a step (image acquisition step) of acquiring an interference image of an observation object placed on the optical path of the first split light or the second split light on the basis of the detection signal.

In the interference observation apparatus and the interference observation method, the light source may be configured to include a laser diode of a longitudinal multimode oscillation.

In the interference observation apparatus and the interference observation method, the interference optical system may be configured to include a first beam splitter and a first mirror on an optical path of the first split light, the first split light reaching the first beam splitter from the splitting beam splitter is transmitted or reflected by the first beam splitter and reflected on the first mirror, the first split light reflected on the first mirror and reaching the first beam splitter is reflected or transmitted by the first beam splitter, and the first split light is output from the first beam splitter in a direction different from an input direction of the first split light from the splitting beam splitter to the first beam splitter.

In the interference observation apparatus and the interference observation method, the interference optical system may be configured to include a second beam splitter and a second mirror on an optical path of the second split light, the second split light reaching the second beam splitter from the splitting beam splitter is transmitted or reflected by the second beam splitter and reflected on the second mirror, the second split light reflected on the second mirror and reaching the second beam splitter is reflected or transmitted by the second beam splitter, and the second split light is output from the second beam splitter in a direction different from an input direction of the second split light from the splitting beam splitter to the second beam splitter.

In the interference observation apparatus and the interference observation method, an observation object may be disposed on any one of the optical paths of the first split light and the second split light, and an optical path length/dispersion compensating plate may be provided on the other optical path, and the optical path length/dispersion compensating plate may compensate an influence of a change of an optical path length and a dispersion caused by the disposed observation object.

INDUSTRIAL APPLICABILITY

The present invention is possible to be used as an interference observation apparatus and an interference observation method which can easily perform an optical adjustment using an optical system of a Mach-Zehnder interferometer, and can easily acquire an interference image of an observation object.

REFERENCE SIGNS LIST 1A-1F—interference observation apparatus, 2—interference optical apparatus, 3—microscope apparatus, 10—light source, 11, 12—lens, 13—monitor photodetector, 20A-20F—interference optical system, 21—splitting beam splitter, 22—combining beam splitter, 31—first beam splitter, 32—first mirror, 35—mirror, 36—image inverting prism, 37—optical rotator, 41—second beam splitter, 42—second mirror, 43—piezo element, 44—stage, 47—optical rotator, 51, 52—lens, 53—tube lens, 54—mirror, 61—photodetector (light receiving unit), 62—photodetector (light receiving unit), 71—image acquisition unit, 72—current control unit (control unit), 73—feedback control unit (control unit), 80—housing, 81—first attachment portion, 82—second attachment portion, 90—observation object (sample), 91—optical path length/dispersion compensating plate.

The invention claimed is:

1. An interference observation apparatus, comprising:
  a light source configured to output laser light having a variable wavelength;
  an interference optical system forming a Mach-Zehnder interferometer, and including a splitting beam splitter configured to split the laser light output from the light source to output first split light and second split light, and a combining beam splitter configured to combine the first split light and the second split light to output combined light; and
  a controller configured to control a wavelength of the laser light output from the light source before the laser light is split by the splitting beam splitter to adjust a phase difference between the first split light and the second split light at the combining by the combining beam splitter,
  wherein an optical path difference between the first split light and the second split light from the splitting beam splitter to the combining beam splitter is set to a non-zero value and concurrently the wavelength of the laser light output from the light source is changed so that a predetermined phase difference shift amount is proportional to a wavelength change amount; and
  wherein the interference optical system includes a first beam splitter and a first mirror on an optical path of the first split light, the first split light reaching the first beam splitter from the splitting beam splitter is transmitted or reflected by the first beam splitter and then reflected on the first mirror, and the first split light reflected on the first mirror reaches the first beam splitter and is then reflected or transmitted by the first beam splitter so that the first split light is output from the first beam splitter in a direction different from an input direction of the first split light from the splitting beam splitter to the first beam splitter.

2. The interference observation apparatus according to claim 1, wherein the light source includes a laser diode of a longitudinal multimode oscillation.

3. The interference observation apparatus according to claim 1, wherein the interference optical system includes a second beam splitter and a second mirror on an optical path of the second split light, the second split light reaching the second beam splitter from the splitting beam splitter is transmitted or reflected by the second beam splitter and then reflected on the second mirror, and the second split light reflected on the second mirror reaches the second beam splitter and is then reflected or transmitted by the second beam splitter so that the second split light is output from the second beam splitter in a direction different from an input direction of the second split light from the splitting beam splitter to the second beam splitter.

4. The interference observation apparatus according to claim 1, further comprising an image sensor configured to receive the combined light and output a detection signal.

5. The interference observation apparatus according to claim 4, further comprising a computer configured to acquire an interference image of an observation object placed on the optical path of the first split light or the second split light on the basis of the detection signal.

6. The interference observation apparatus according to claim 1, wherein an observation object is disposed on any one of the optical paths of the first split light and the second split light, and an optical path length/dispersion compensating plate is provided on the other optical path, and
  the optical path length/dispersion compensating plate is configured to compensate an influence of a change of an optical path length and a dispersion caused by the disposed observation object.

7. The interference observation apparatus according to claim 1, further comprising:
  a housing configured to hold the light source and the interference optical system;
  a first attachment portion provided in the housing and having an opening configured to output the combined light output from the interference optical system to the outside; and
  a microscope apparatus including a second attachment portion having an opening optically coupled to the opening of the first attachment portion, and an image sensor configured to receive the combined light output from the interference optical system through the opening of the first attachment portion and the opening of the second attachment portion and output a detection signal.

8. The interference observation apparatus according to claim 1, wherein the controller is configured to control the wavelength of the laser light output from the light source by adjusting a current supplied to the light source.

9. An interference observation method, comprising:
  outputting laser light from a light source having a variable wavelength;
  splitting the laser light output from the light source into first split light and second split light by a splitting beam splitter of an interference optical systemforming a Mach-Zehnder interferometer;

combining the first split light and the second split light by a combining beam splitter of the interference optical system to output combined light; and controlling a wavelength of the laser light output from the light source before the laser light is split by the splitting beam splitter to adjust a phase difference between the first split light and the second split light at the combining by the combining beam splitter, wherein an optical path difference between the first split light and the second split light from the splitting beam splitter to the combining beam splitter is set to a non-zero value and concurrently the wavelength of the laser light output from the light source is changed so that a predetermined phase difference shift amount is proportional to a wavelength change amount; and wherein the interference optical system includes a first beam splitter and a first mirror on an optical path of the first split light, the first split light reaching the first beam splitter from the splitting beam splitter is transmitted or reflected by the first beam splitter and then reflected on the first mirror, and the first split light reflected on the first mirror reaches the first beam splitter and is then reflected or transmitted by the first beam splitter so that the first split light is output from the first beam splitter in a direction different from an input direction of the first split light from the splitting beam splitter to the first beam splitter.

10. The interference observation method according to claim 9, wherein the light source includes a laser diode of a longitudinal multimode oscillation.

11. The interference observation method according to claim 9, wherein the interference optical system includes a second beam splitter and a second mirror on an optical path of the second split light, the second split light reaching the second beam splitter from the splitting beam splitter is transmitted or reflected by the second beam splitter and then reflected on the second mirror, and the second split light reflected on the second mirror reaches the second beam splitter and is then reflected or transmitted by the second beam splitter so that the second split light is output from the second beam splitter in a direction different from an input direction of the second split light from the splitting beam splitter to the second beam splitter.

12. The interference observation method according to claim 9, further comprising:
receiving the combined light by an image sensor and outputting a detection signal; and
acquiring an interference image of an observation object placed on the optical path of the first split light or the second split light on the basis of the detection signal.

13. The interference observation method according to claim 9, wherein an observation object is disposed on any one of the optical paths of the first split light and the second split light, and an optical path length/dispersion compensating plate is provided on the other optical path, and
the optical path length/dispersion compensating plate is configured to compensate an influence of a change of an optical path length and a dispersion caused by the disposed observation object.

14. The interference observation method according to claim 9, wherein the wavelength of the laser light output from the light source is controlled by adjusting a current supplied to the light source.

* * * * *